(12) United States Patent
Nozu et al.

(10) Patent No.: US 10,507,727 B2
(45) Date of Patent: Dec. 17, 2019

(54) FOUR-WHEEL-DRIVE VEHICLE

(71) Applicant: JTEKT CORPORATION, Osaka-shi (JP)

(72) Inventors: Tomohiro Nozu, Anjo (JP); Tetsuya Yamazaki, Tokai (JP); Tomoaki Kato, Kariya (JP); Tsutomu Matsumoto, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/051,608

(22) Filed: Aug. 1, 2018

(65) Prior Publication Data

US 2019/0039455 A1 Feb. 7, 2019

(30) Foreign Application Priority Data

Aug. 7, 2017 (JP) .................................. 2017-152749

(51) Int. Cl.
*B60K 23/08* (2006.01)
*B60K 17/354* (2006.01)

(52) U.S. Cl.
CPC ........ *B60K 23/0808* (2013.01); *B60K 17/354* (2013.01); *B60K 2023/0866* (2013.01)

(58) Field of Classification Search
CPC ................. B60K 23/0808; F16H 61/12; F16H 2061/126; F16D 48/06; F16D 48/10
See application file for complete search history.

(56) References Cited

U.S. PATENT DOCUMENTS

| 5,819,192 A | 10/1998 | Wakahara et al. | |
| 2005/0126875 A1* | 6/2005 | Bruder | B60K 23/0808 192/13 R |
| 2011/0270483 A1* | 11/2011 | Endo | F16H 61/12 701/31.4 |
| 2015/0369307 A1* | 12/2015 | Yoshino | F16D 48/066 701/67 |

FOREIGN PATENT DOCUMENTS

| JP | 07-186752 | 7/1995 |
| JP | 2012-218668 | 11/2012 |

* cited by examiner

*Primary Examiner* — Edwin A Young
(74) *Attorney, Agent, or Firm* — Oblon McClelland, Maier & Neustadt, L.L.P.

(57) ABSTRACT

In a four-wheel-drive vehicle, a hydraulic unit has an electric motor, to which a motor current is supplied from a control device, and a pump that is actuated by rotation of a motor shaft, and a drive force transfer device has a piston that is moved by the pressure of working oil discharged from the pump, and a friction clutch that is switchable between a transfer state and a blocked state, in which transfer of a drive force to rear wheels is allowed and blocked, respectively, in accordance with movement of the piston. The control device detects the presence or absence of an abnormality of a flow passage forming member, which forms a flow passage for working oil, in accordance with at least any of a motor current and the number of revolutions of a motor shaft at the time when the motor shaft is rotated by applying a voltage to the electric motor.

13 Claims, 16 Drawing Sheets

FOUR-WHEEL-DRIVE VEHICLE

INCORPORATION BY REFERENCE

The disclosure of Japanese Patent Application No. 2017-152749 filed on Aug. 7, 2017 including the specification, drawings and abstract, is incorporated herein by reference in its entirety.

BACKGROUND OF THE INVENTION

1. Field of the Invention

The present invention relates to a four-wheel-drive vehicle that is switchable between a four-wheel-drive state and a two-wheel-drive state.

2. Description of the Related Art

In some of four-wheel-drive vehicles according to the related art that are switchable between a four-wheel-drive state, in which a drive force of a drive source is transferred to main drive wheels and auxiliary drive wheels, and a two-wheel-drive state, in which the drive force of the drive source is transferred to only the main drive wheels, the drive force is transferred to the auxiliary drive wheels via a clutch that operates in accordance with the pressure of a working fluid discharged from a pump that is rotationally driven by an electric motor. Some of such four-wheel-drive vehicles can detect an abnormality when an abnormality occurs in a flow passage for the working fluid that extends from the pump to the clutch. See Japanese Patent Application Publication No. 7-186752 (JP 7-186752 A) and Japanese Patent Application Publication No. 2012-218668 (JP 2012-218668 A), for example.

JP 7-186752 A describes a four-wheel-drive vehicle that has: a switching valve that discharges a clutch pressure to a variable torque clutch when working oil regulated to a predetermined pressure is supplied as a control pressure and that stops discharge of the clutch pressure to the variable torque clutch when supply of the control pressure is stopped; and a switching valve abnormality determination unit that determines presence or absence of an abnormality of the switching valve. The switching valve abnormality determination unit supplies the control pressure to the switching valve by actuating an electromagnetic open/close valve while supplying a predetermined pressure to the primary side of the switching valve, and determines whether or not the clutch pressure is discharged from the switching valve on the basis of a detection value obtained by a pressure detection unit. If it is determined that the clutch pressure is discharged from the switching valve, it is determined that the switching valve is normal. On the other hand, if it is determined, on the basis of the detection value which is obtained by the pressure detection unit, that the clutch pressure is not discharged from the switching valve, it is determined that the switching valve is abnormal, and an alarming process is performed.

JP 2012-218668 A describes a four-wheel-drive vehicle that has a solenoid valve that regulates a hydraulic pressure in a piston chamber by controlling opening and closing of an oil passage through PWM control performed by a control device. After the oil passage is pressurized through actuation of an oil pump, the control device outputs an open command to the solenoid valve, and determines whether or not the pressure in the oil passage is lowered in accordance with a detection value from a hydraulic sensor. If the solenoid valve functions normally, the solenoid valve is opened to lower the pressure in the oil passage. If a sticking failure is caused in the solenoid valve, the pressure in the oil passage is not lowered but maintained. In the case where the hydraulic pressure is not lowered even when a predetermined stand-by time elapses, it is definitely determined that a sticking failure is caused in the solenoid valve.

With the four-wheel-drive vehicles according to JP 7-186752 A and JP 2012-218668 A, it is necessary to dispose a pressure detection unit, such as a hydraulic sensor, in the oil passage and connect the pressure detection unit and the control device to each other using a wire in order to determine an abnormality of the switching valve or the solenoid valve. Installation of such a pressure detection unit increases the device cost.

SUMMARY OF THE INVENTION

It is an object of the present invention to provide a four-wheel-drive vehicle that is capable of detecting the presence or absence of an abnormality of a flow passage forming member that constitutes a flow passage even without installing a pressure detection unit, such as a pressure sensor, that detects a pressure in a flow passage for a working fluid discharged from a pump.

An aspect of the present invention provides a four-wheel-drive vehicle including:

main drive wheels and auxiliary drive wheels, to which a drive force of a drive source is transferred;

a drive force transfer device that is capable of blocking transfer of the drive force to the auxiliary drive wheels;

a hydraulic unit that supplies a working fluid to the drive force transfer device; and a control device that controls the hydraulic unit.

The four-wheel-drive vehicle is switchable between a four-wheel-drive state, in which the drive force is transferred to the main drive wheels and the auxiliary drive wheels, and a two-wheel-drive state, in which the drive force is transferred to only the main drive wheels.

The hydraulic unit has an electric motor, to which a motor current is supplied from the control device, and a pump that is actuated by rotation of a motor shaft of the electric motor. The drive force transfer device has a piston that is moved by a pressure of a working fluid supplied from the pump to a cylinder, and a clutch that is switchable between a transfer state, in which transfer of the drive force to the auxiliary drive wheels is allowed, and a blocked state, in which such transfer is blocked, in accordance with movement of the piston. The control device detects presence or absence of an abnormality of a flow passage forming member, which forms a flow passage for the working fluid, in accordance with at least any of the motor current and a number of revolutions of the motor shaft at the time when the motor shaft is rotated by applying a voltage to the electric motor.

With the four-wheel-drive vehicle according to the aspect described above, it is possible to detect the presence or absence of an abnormality of a flow passage forming member that constitutes a flow passage even without installing a pressure detection unit, such as a pressure sensor, that detects a pressure in a flow passage for a working fluid discharged from a pump.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described with reference to FIGS. 1 to 16.

Figure 1:
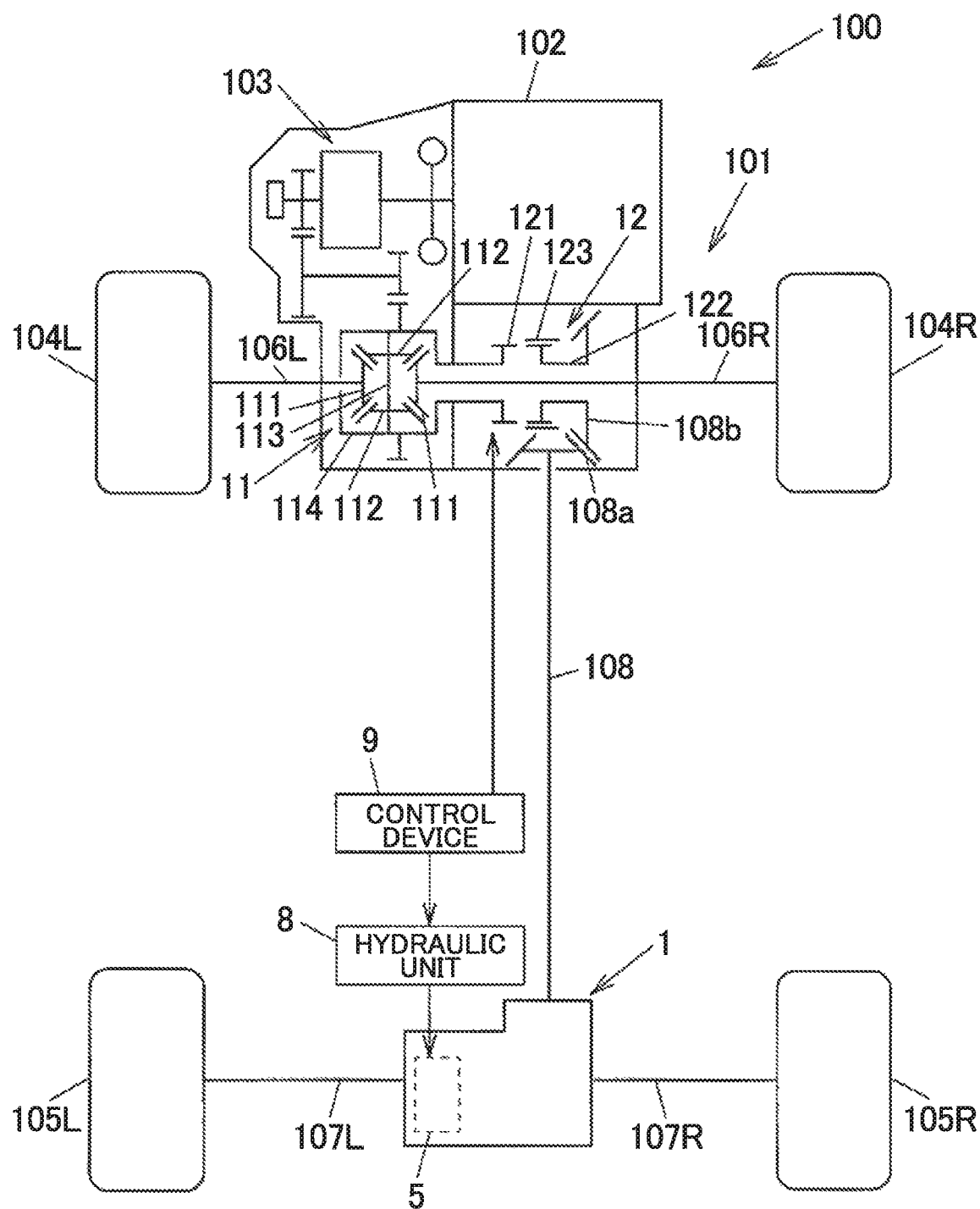
FIG. 1 is a diagram illustrating an example of the configuration of a four-wheel-drive vehicle according to an embodiment of the present invention.

FIG. 1 is a diagram schematically illustrating an example of the configuration of a four-wheel-drive vehicle according to an embodiment of the present invention. A four-wheel-drive vehicle 100 includes an engine 102 that serves as a drive source that generates a drive force for travel, a transmission 103, a pair of right and left front wheels 104R, 104L that serve as main drive wheels, a pair of right and left rear wheels 105R, 105L that serve as auxiliary drive wheels, a drive force transfer system 101 that transfers the drive force of the engine 102 to the front wheels 104R, 104L and the rear wheels 105R, 105L, a hydraulic unit 8, and a control device 9 that controls the hydraulic unit 8. The four-wheel-drive vehicle 100 is switchable between a four-wheel-drive state, in which the drive force of the engine 102 is transferred to the front wheels 104R, 104L and the rear wheels 105R, 105L, and a two-wheel-drive state, in which the drive force of the engine 102 is transferred to only the front wheels 104R, 104L. In the present embodiment, the symbols "R" and "L" mean the right side and the left side, respectively, with respect to the direction of forward travel of the vehicle.

The drive force transfer system 101 has, as its constituent elements: a front differential 11; a mesh clutch 12 that can block transfer of the drive force; a propeller shaft 108 that extends in the vehicle front-rear direction; a drive force transfer device 1 that is actuated upon receiving supply of working oil from the hydraulic unit 8; drive shafts 106R, 106L on the front wheel side; and drive shafts 107R, 107L on the rear wheel side. The drive force of the engine 102 is always transferred to the front wheels 104R, 104L. The drive force of the engine 102 is transferred to the rear wheels 105R, 105L via the mesh clutch 12, the propeller shaft 108, and the drive force transfer device 1.

The drive force transfer device 1 can block transfer of the drive force from the propeller shaft 108 to the right and left rear wheels 105R, 105L. The control device 9 controls the drive force transfer device 1 by increasing and decreasing the pressure of working oil supplied from the hydraulic unit 8 to the drive force transfer device 1. The mesh clutch 12 is an aspect of the first engagement/disengagement portion according to the present invention which is provided on the upstream side of the propeller shaft 108 to allow and block transfer of a drive force. The drive force transfer device 1 is an aspect of the second engagement/disengagement portion according to the present invention which is provided on the downstream side of the propeller shaft 108 to allow and block transfer of a drive force.

During travel in the two-wheel-drive state, rotation of the propeller shaft 108 which is a part of the drive force transfer system 101 is stopped with both transfer of a drive force through the mesh clutch 12 and transfer of a drive force through the drive force transfer device 1 blocked. Consequently, a power loss that accompanies rotation of the propeller shaft 108 is reduced, which improves the fuel efficiency. In the four-wheel-drive state, meanwhile, a drive force is transferred to the rear wheels 105R, 105L via the mesh clutch 12, the propeller shaft 108, and the drive force transfer device 1.

The front differential 11 has: a pair of side gears 111 coupled to the pair of drive shafts 106R, 106L on the front wheel side; a pair of pinion gears 112 meshed with the pair of side gears 111 with their gear axes orthogonal to each other; a pinion gear support member 113 that supports the pair of pinion gears 112; and a front differential case 114 that houses the pair of side gears 111, the pair of pinion gears 112, and the pinion gear support member 113. A drive force of the engine 102, the speed of which has been changed by the transmission 103, is transferred to the front differential case 114.

The mesh clutch 12 has: a first rotary member 121 that is rotatable together with the front differential case 114; a second rotary member 122 disposed side by side with the first rotary member 121 in the axial direction; and a sleeve 123 that is capable of coupling the first rotary member 121 and the second rotary member 122 so as not to be rotatable relative to each other. The sleeve 123 is moved in the axial direction by an actuator (not illustrated) controlled by the control device 9 between a coupled position, at which the sleeve 123 is meshed with the first rotary member 121 and the second rotary member 122, and a non-coupled position, at which the sleeve 123 is meshed with only the second rotary member 122. When the sleeve 123 is located at the coupled position, the first rotary member 121 and the second rotary member 122 are coupled so as not to be rotatable relative to each other. When the sleeve 123 is located at the non-coupled position, the first rotary member 121 and the second rotary member 122 are rotatable relative to each other.

The propeller shaft 108 receives torque of the engine 102 from the front differential case 114 via the mesh clutch 12, and transfers the torque to the drive force transfer device 1 side. A pinion gear 108a is provided at an end portion of the propeller shaft 108 on the front wheel side. The pinion gear 108a is meshed with a ring gear 108b coupled so as not to be rotatable relative to the second rotary member 122 of the mesh clutch 12.

The engine 102 drives the pair of front wheels 104R, 104L by outputting a drive force to the pair of drive shafts 106R, 106L on the front wheel side via the transmission 103 and the front differential 11. Meanwhile, the engine 102 drives the pair of rear wheels 105R, 105L by outputting a drive force to the pair of drive shafts 107R, 107L on the rear wheel side via the transmission 103, the mesh clutch 12, the propeller shaft 108, and the drive force transfer device 1.

The drive force transfer device 1 distributes the drive force which is input from the propeller shaft 108 to the drive shafts 107R, 107L on the rear wheel side while allowing differential motion. The drive shaft 107R is coupled to the right rear wheel 105R. The drive shaft 107L is coupled to the left rear wheel 105L. The control device 9 controls the drive force transfer device 1 such that a larger drive force is transferred to the rear wheels 105R, 105L as the rotational speed difference which is the difference between the average rotational speed of the front wheels 104R, 104L and the average rotational speed of the rear wheels 105R, 105L is larger, and as the amount of depressing operation of an accelerator pedal by a driver is larger, for example.

Figure 2:
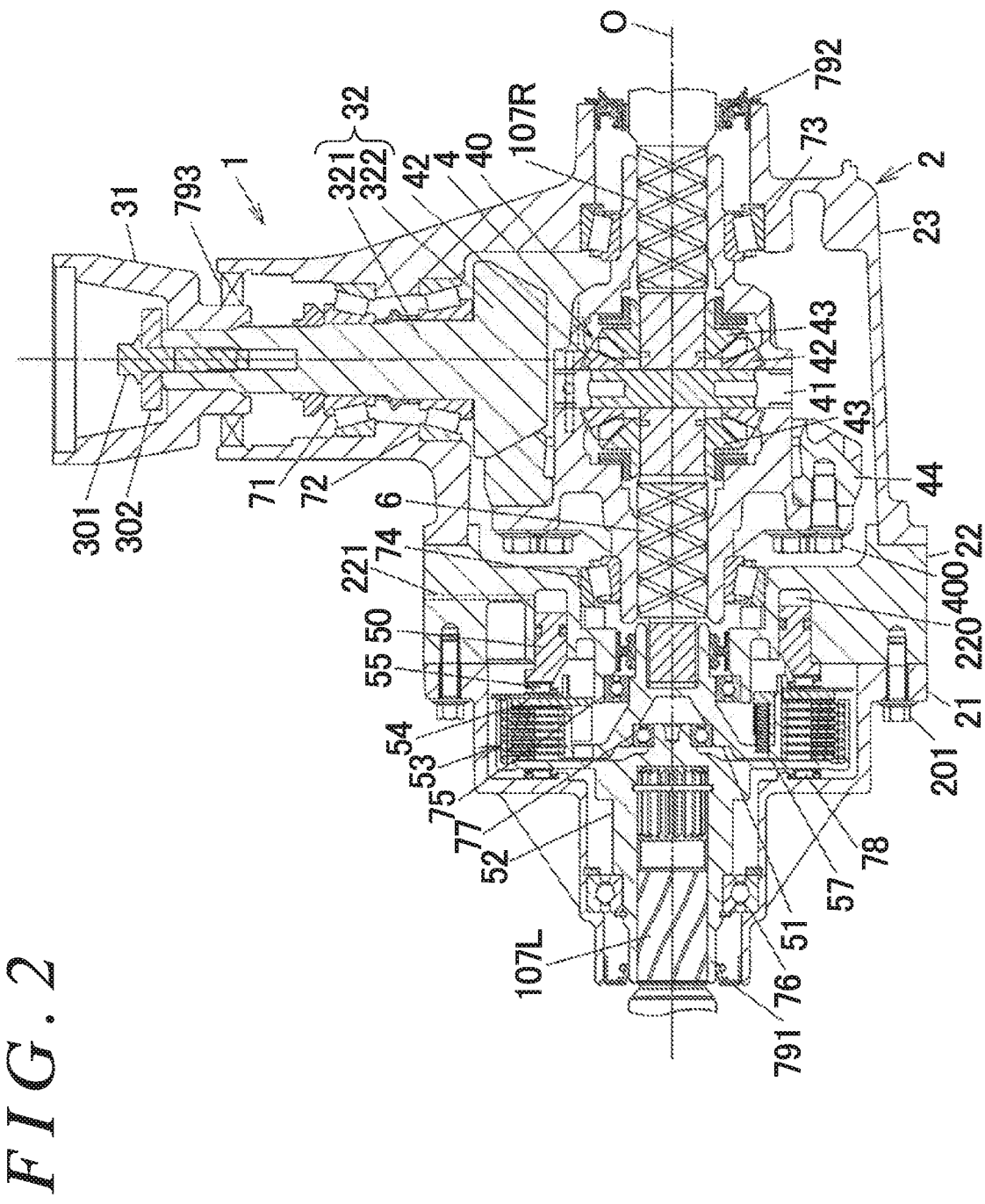
FIG. 2 is a sectional view illustrating an example of the configuration of a drive force transfer device.
Figure 3:
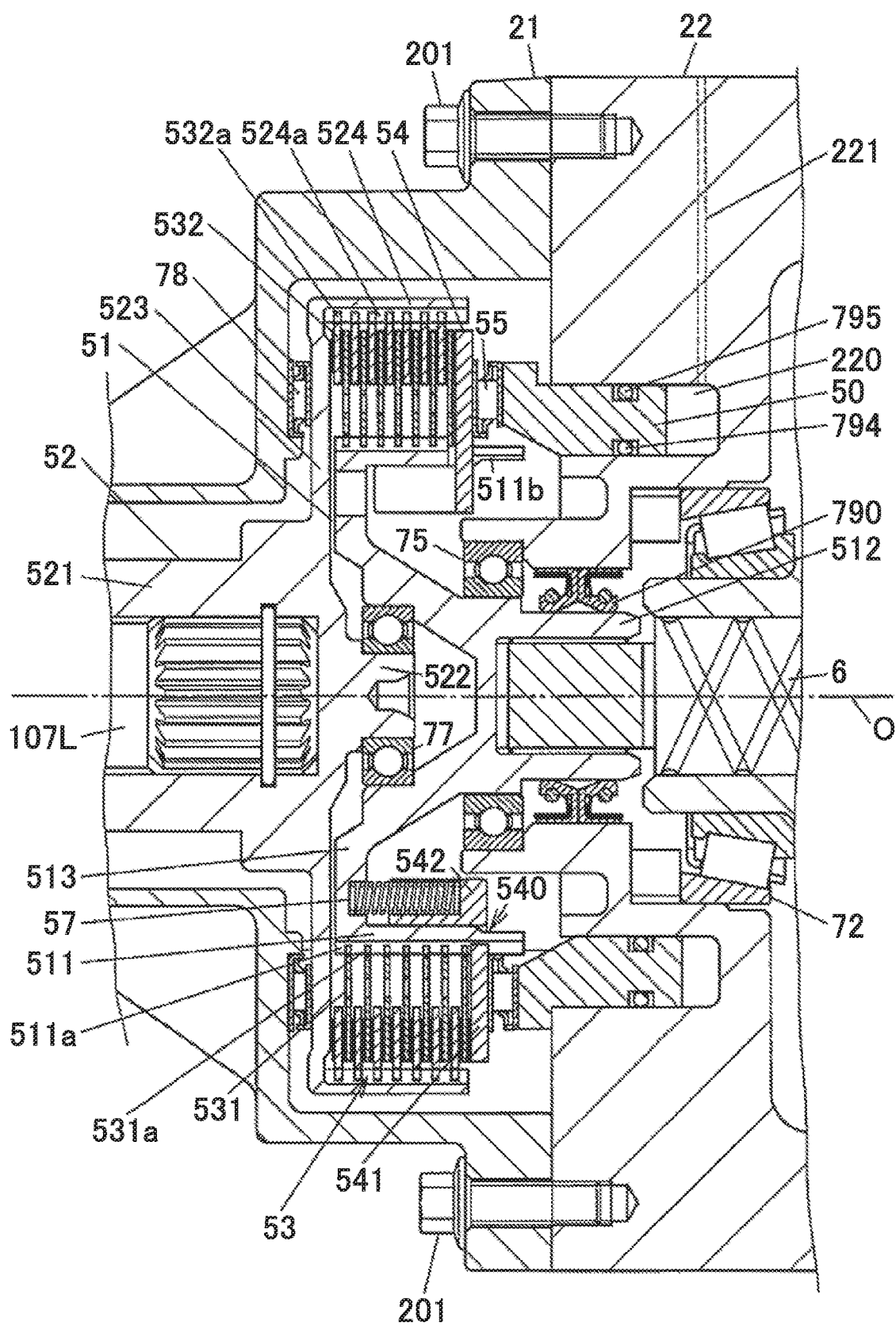
FIG. 3 is a partial enlarged view of FIG. 2.

FIG. 2 is a sectional view illustrating an example of the configuration of the drive force transfer device 1. FIG. 3 is a partial enlarged view of FIG. 2. In FIG. 2, the entire drive force transfer device 1 is illustrated together with a part of the drive shafts 107R, 107L on the rear wheel side.

The drive force transfer device 1 includes: a device case 2 supported by the vehicle body; a coupling member 31, to which the propeller shaft 108 is coupled; a pinion gear shaft 32 that is rotatable together with the coupling member 31; a differential case 40 that is rotatable upon receiving a drive force of the engine 102 from the pinion gear shaft 32; a differential gear mechanism 4 that outputs the drive force which is input to the differential case 40 from a pair of side gears 43 while allowing differential motion; a clutch mechanism 5 that transfers a drive force between one of the side gears 43 of the differential gear mechanism 4 and the drive shaft 107L; and an intermediate shaft 6 in a shaft shape disposed between the differential gear mechanism 4 and the clutch mechanism 5.

The coupling member 31 and the pinion gear shaft 32 are coupled to each other by a bolt 301 and a washer 302. The pinion gear shaft 32 has a shaft portion 321 and a gear portion 322. The shaft portion 321 is rotatably supported by a pair of tapered roller bearings 71, 72. The gear portion 322 is meshed with a ring gear 44 fixed by a plurality of bolts 400 so as to rotate together with the differential case 40. The gear portion 322 of the pinion gear shaft 32 and the ring gear 44 are hypoid gears, for example, and are lubricated by gear oil sealed in the device case 2.

The differential gear mechanism 4 has: a pinion shaft 41 supported by the differential case 40; a pair of pinion gears 42 supported by the pinion shaft 41; and the pair of side gears 43 which are meshed with the pair of pinion gears 42 with their gear axes orthogonal to each other. The differential case 40 is supported by tapered roller bearings 73, 74 so as to be rotatable with respect to the device case 2. The intermediate shaft 6 is coupled so as not to be rotatable relative to the one of the pair of side gears 43. The clutch mechanism 5 can allow and block transfer of a drive force input from the intermediate shaft 6 to the drive shaft 107L in an adjustable manner.

When the four-wheel-drive vehicle 100 is traveling forward, and when the drive force which is transferred from the one of the side gears 43 to the drive shaft 107L through the intermediate shaft 6 and the clutch mechanism 5 is adjusted, a drive force that is equivalent to the drive force which is transferred to the drive shaft 107L is also transferred to the drive shaft 107R through the differential function of the differential gear mechanism 4. The drive shaft 107R is coupled so as not to be rotatable relative to the other of the pair of side gears 43, which is on the opposite side from the intermediate shaft 6, through spline fitting. The drive shaft 107L is coupled so as not to be rotatable relative to a coupling portion 521 of a second rotary member 52 to be discussed later through spline fitting. When transfer of a drive force to the drive shaft 107L through the clutch mechanism 5 is blocked, a drive force is not transferred to the drive shaft 107R, either.

The clutch mechanism 5 has: a piston 50 that operates in accordance with the pressure of working oil supplied from the hydraulic unit 8; a first rotary member 51 that is rotatable together with the intermediate shaft 6; the second rotary member 52 which is rotatable together with the drive shaft 107L; a friction clutch 53 disposed between the first rotary member 51 and the second rotary member 52; and a pressure plate 54 and a thrust roller bearing 55 disposed between the piston 50 and the friction clutch 53. The clutch mechanism 5 outputs a drive force input to the first rotary member 51 from the second rotary member 52 to the drive shaft 107L.

As illustrated in FIG. 3, the friction clutch 53 is composed of: a plurality of inner clutch plates 531 that are rotatable together with the first rotary member 51; and a plurality of outer clutch plates 532 that are rotatable together with the second rotary member 52. Frictional sliding between the inner clutch plates 531 and the outer clutch plates 532 is lubricated by lubricating oil (not illustrated). The plurality of inner clutch plates 531 and the plurality of outer clutch plates 532 are disposed alternately along the axial direction.

The friction clutch 53 transfers a drive force between the first rotary member 51 and the second rotary member 52 using a friction force between the inner clutch plates 531 and the outer clutch plates 532 generated upon receiving a pressing force of the piston 50 via the pressure plate 54 and the thrust roller bearing 55. The piston 50 presses the friction clutch 53 through axial movement along a rotational axis O of the first rotary member 51 and the second rotary member 52.

The first rotary member 51 has: a cylindrical portion 511 in a cylindrical shape, on the outer peripheral surface of which a spline engagement portion 511a composed of a plurality of spline projections that extend along the axial direction is formed; a coupling portion 512 in a bottomed cylindrical shape which is smaller in diameter than the cylindrical portion 511 and to which the intermediate shaft 6 is coupled through spline fitting; and a connection portion 513 that connects between the cylindrical portion 511 and the coupling portion 512. The cylindrical portion 511, the coupling portion 512, and the connection portion 513 are integral with each other. A seal member 790 supported by the device case 2 makes sliding contact with the outer peripheral surface of the coupling portion 512. The seal member 790 separates a housing space for the clutch mechanism 5 and a housing space for the differential gear mechanism 4 from each other.

The pressure plate 54 is formed with an insertion hole 540 that allows insertion of a projection 511b formed at an end portion of the cylindrical portion 511 of the first rotary member 51. The pressure plate 54 is not rotatable relative to, and is movable in the axial direction with respect to, the first rotary member 51. The pressure plate 54 has: a pressing portion 541 disposed on the outer peripheral side with respect to the cylindrical portion 511 of the first rotary member 51 to press the friction clutch 53; and an inner wall portion 542 disposed on the inner side of the cylindrical portion 511. The insertion hole 540 is formed between the pressing portion 541 and the inner wall portion 542. A plurality of coil springs 57 are disposed, as compressed in the axial direction, between the inner wall portion 542 of the pressure plate 54 and the connection portion 513 of the first rotary member 51. In FIGS. 2 and 3, one of such coil springs 57 is illustrated. The plurality of coil springs 57 urge the pressure plate 54 toward the piston 50.

The second rotary member 52 is placed in parallel with the first rotary member 51 in the axial direction. As illustrated in FIG. 3, the second rotary member 52 has: the coupling portion 521, to which the drive shaft 107L is coupled; a boss portion 522 that projects in the axial direction from an end portion of the coupling portion 521 on the first rotary member 51 side; a wall portion 523 in an annular shape that bulges outward from the coupling portion 521; and a cylindrical portion 524 in a cylindrical shape that extends in the axial direction from an outer peripheral end portion of the wall portion 523. The coupling portion 521, the boss portion 522, the wall portion 523, and the cylindrical portion 524 are integral with each other.

The friction clutch 53 is disposed between the cylindrical portion 511 of the first rotary member 51 and the cylindrical portion 524 of the second rotary member 52. A plurality of projections 531a are formed at an end portion of the inner clutch plates 531 on the inner peripheral side to be engaged with the spline engagement portion 511a of the cylindrical portion 511 of the first rotary member 51. Consequently, the inner clutch plates 531 are coupled to the first rotary member 51 so as to be movable in the axial direction with respect to, and so as not to be rotatable relative to, the first rotary member 51. A plurality of projections 532a are formed at an end portion of the outer clutch plates 532 on the outer peripheral side to be engaged with a spline engagement portion 524a formed on the inner peripheral surface of the cylindrical portion 524 of the second rotary member 52. Consequently, the outer clutch plates 532 are coupled to the second rotary member 52 so as to be movable in the axial direction with respect to, and so as not to be rotatable relative to, the second rotary member 52.

The first rotary member 51 is supported by a ball bearing 75 attached to the device case 2. The second rotary member 52 is supported by a ball bearing 76 disposed between the coupling portion 521 and the inner surface of the device case 2. A ball bearing 77 is disposed between the outer peripheral surface of the boss portion 522 of the second rotary member 52 and the first rotary member 51. A thrust roller bearing 78 is disposed between the wall portion 523 of the second rotary member 52 and the inner surface of the first case member 21.

The device case 2 has: a first case member 21 that houses the clutch mechanism 5; a second case member 22 formed with the cylinder chamber 220; and a third case member 23 that houses the differential gear mechanism 4 and the differential case 40. The first case member 21 and the second case member 22, and the second case member 22 and the third case member 23, are coupled to each other by bolts, for example. In FIGS. 2 and 3, a plurality of bolts 201 that couple the first case member 21 and the second case member 22 to each other are illustrated.

A seal member 791 is fitted with the inner surface of an insertion hole of the first case member 21 through which the second rotary member 52 is inserted. A seal member 792 is fitted with the inner surface of an insertion hole of the third case member 23 through which the drive shaft 107R is inserted. A seal member 793 is fitted with the inner surface of an insertion hole of the third case member 23 through which the coupling member 31 and the pinion gear shaft 32 are inserted.

The second case member 22 is provided with: the cylinder chamber 220 in an annular shape which is supplied with working oil that applies a hydraulic pressure to the piston 50 to move the piston 50 toward the friction clutch 53; and a working oil supply hole 221 through which working oil is supplied to the cylinder chamber 220. The cylinder chamber 220 is formed in a circular ring shape concentrically about the rotational axis O.

The cylinder chamber 220 is supplied with working oil from the hydraulic unit 8 via the working oil supply hole 221. The piston 50 is movable back and forth in the axial direction which is parallel to the rotational axis O with a part of the piston 50 in the axial direction disposed in the cylinder chamber 220, and presses the friction clutch 53 in the axial direction using the hydraulic pressure of working oil supplied to the cylinder chamber 220 to cause the inner clutch plates 531 and the outer clutch plates 532 to frictionally contact each other. The friction clutch 53 is switchable between a transfer state and a blocked state, in which transfer of a drive force is allowed and blocked, respectively, through movement of the piston 50.

When the pressure of working oil in the cylinder chamber 220 is lowered, the piston 50 is moved toward the deeper side of the cylinder chamber 220 by the urging force of the coil springs 57 which is received via the pressure plate 54, and moved away from the friction clutch 53. A circumferential groove is formed in each of the inner peripheral surface and the outer peripheral surface of the piston 50. O-rings 794 and 795 are held in such circumferential grooves.

Figure 4:
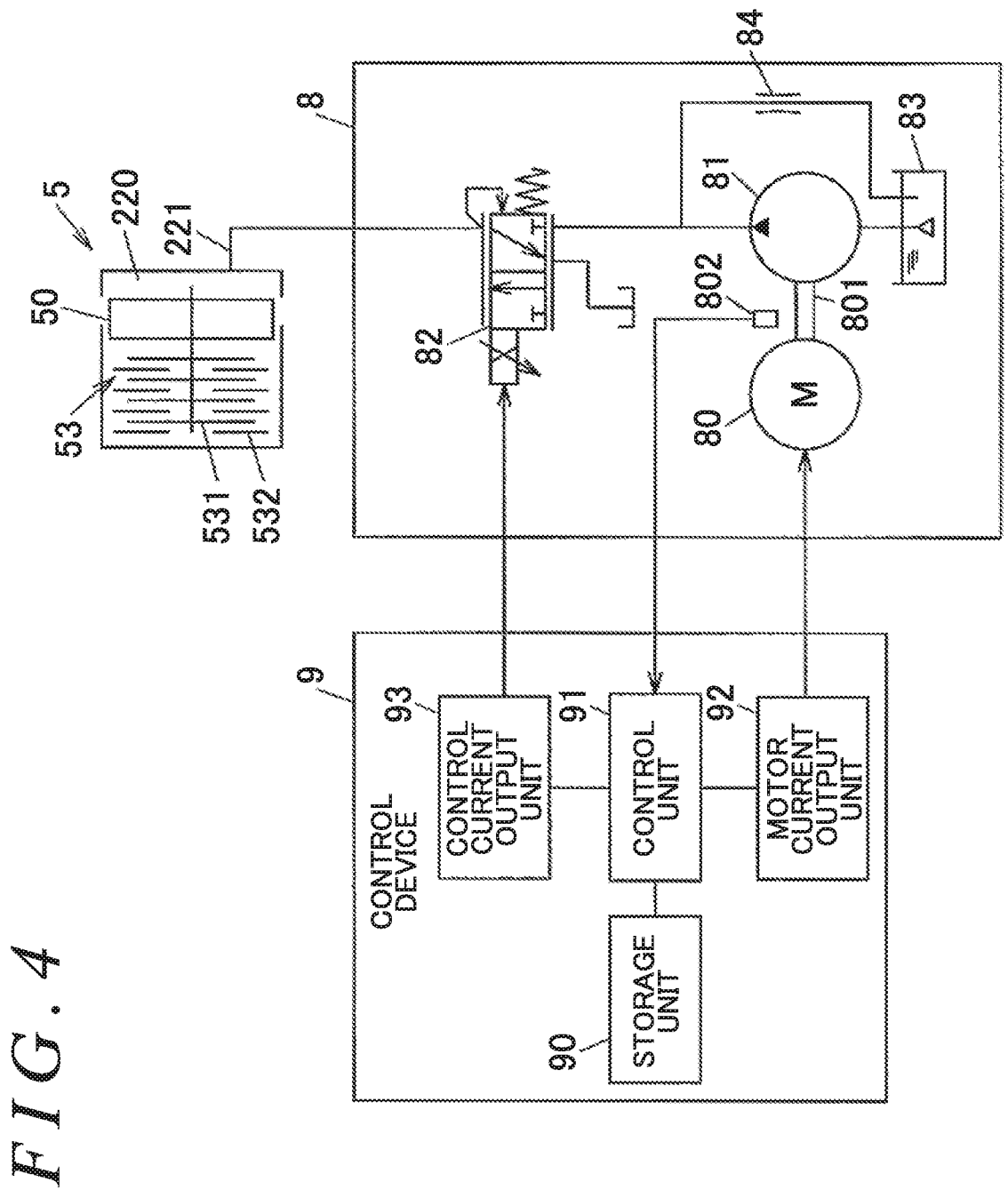
FIG. 4 is a diagram illustrating an example of the configuration of a clutch mechanism, a hydraulic unit, and a control device.

FIG. 4 is a diagram schematically illustrating an example of the configuration of the clutch mechanism 5, the hydraulic unit 8, and the control device 9. The hydraulic unit 8 has: an electric motor 80, to which a motor current is supplied from the control device 9; a pump 81 that is actuated by rotation of a motor shaft (output shaft) 801 of the electric motor 80 to discharge working oil as a working fluid; an electromagnetic valve 82 that regulates a hydraulic pressure that acts on the piston 50 upon receiving the working oil which is discharged from the pump 81; a reservoir 83 that stores working oil; and an orifice (throttle valve) 84 disposed between the discharge side of the pump 81 and the reservoir 83.

The electric motor 80 is a three-phase brushless DC motor in which windings for three phases are wound around a stator, for example. However, the electric motor 80 may be a brushed DC motor. The motor shaft 801 is rotatable together with a rotor of the electric motor 80. The amount of rotation of the motor shaft 801 is detected by a rotation sensor 802 such as a resolver or an encoder.

The pump 81 is well known itself, and pumps up an amount of working oil that matches the number of revolutions of the electric motor 80 from the reservoir 83, discharges the working oil, and generates a hydraulic pressure to be supplied to the electromagnetic valve 82. An external gear pump, an internal gear pump, or a vane pump, for example, can be used as the pump 81.

The electromagnetic valve 82 is a pressure control valve, more specifically an electromagnetic proportional pressure control valve, that regulates the pressure of working oil to be supplied from the pump 81 to the cylinder chamber 220. The electromagnetic valve 82 is disposed between the pump 81 and the cylinder chamber 220 in a flow passage (oil passage) for working oil. The pressure of working oil output to the cylinder chamber 220 can be varied by varying the flow passage area between a supply port and an output port and a discharge port of a sleeve in a tubular shape by moving a spool valve disposed inside the sleeve using an electromagnetic solenoid, for example.

The valve opening of the electromagnetic valve 82 is varied in accordance with a control current supplied from the control device 9 to the electromagnetic valve 82. The electromagnetic valve 82 outputs working oil to the cylinder chamber 220 with the pressure of the working oil decreased by discharging a part of working oil discharged from the pump 81. The control device 9 controls the electric motor 80 such that the discharge pressure of the pump 81 is higher than the hydraulic pressure of working oil that should act on the piston 50. The pump 81, the electromagnetic valve 82, the orifice 84, the cylinder chamber 220, and the piston 50 constitute a flow passage forming member that forms a flow passage for working oil. The hydraulic unit 8 and the drive force transfer device 1 do not have a pressure detection unit such as a hydraulic pressure sensor that detects the hydraulic pressure of working oil to be supplied to the cylinder chamber 220.

As illustrated in FIG. 4, the control device 9 has: a storage unit 90 composed of a semiconductor storage element; a control unit 91 composed of a computation element such as a CPU; a motor current output unit 92 that outputs a motor current to the electric motor 80; and a control current output unit 93 that outputs a control current to the electromagnetic valve 82. The motor current output unit 92 has a plurality of switching elements that switch and output a DC voltage of a battery or the like to the electric motor 80, for example, and supplies a three-phase AC current as the motor current to the electric motor 80 through PWM control. Similarly, the control current output unit 93 outputs a control current to the electromagnetic valve 82 through PWM control performed by switching elements.

In addition, the control device 9 detects the presence or absence of an abnormality of the flow passage forming member in accordance with at least any of the motor current and the number of revolutions of the motor shaft 801 at the time when the motor shaft 801 is rotated by applying a voltage to the electric motor 80. Such a process will be described in detail below.

Figure 5:
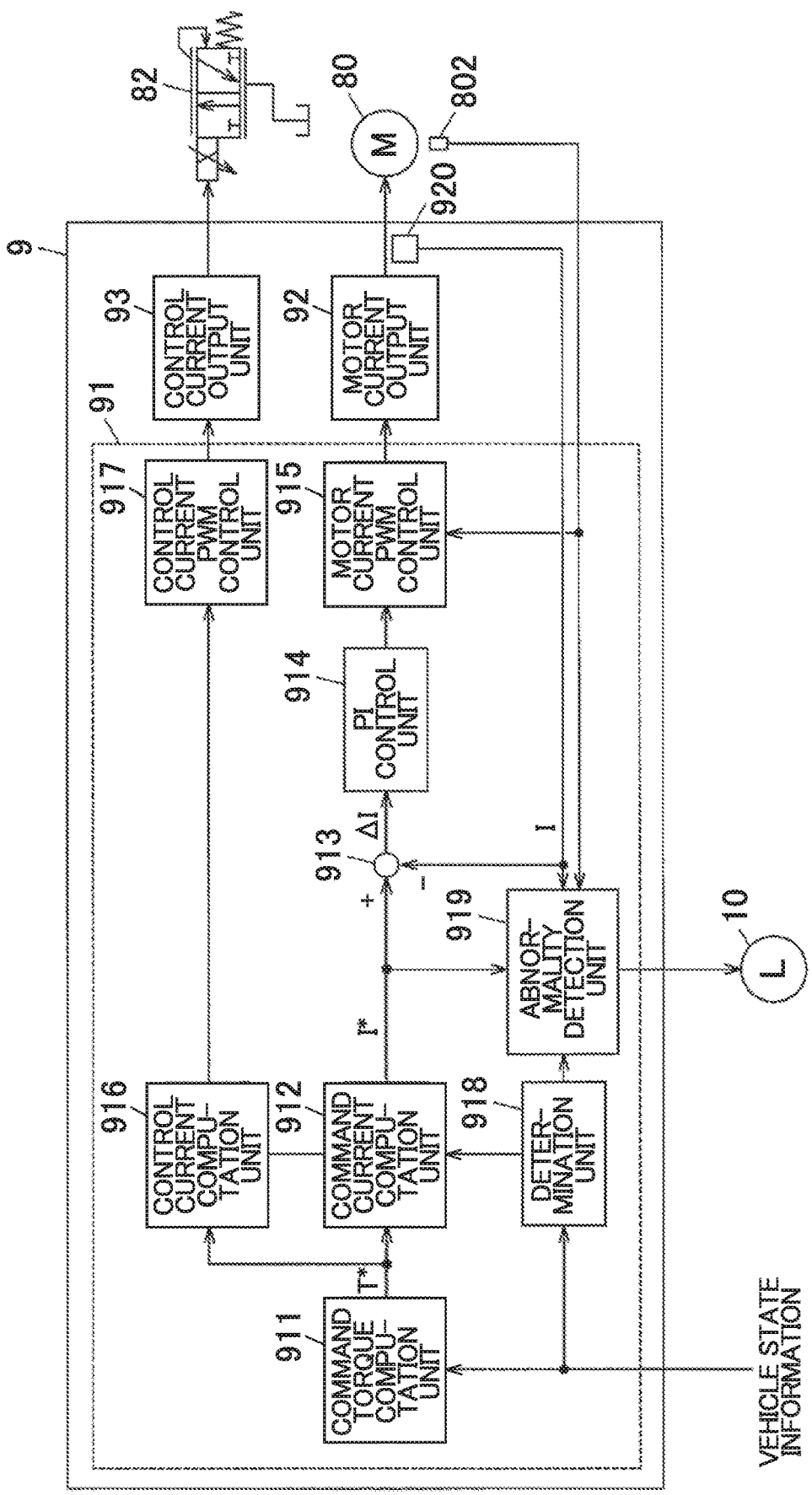
FIG. 5 is a control block diagram illustrating a process executed by a control unit to control an electric motor.

FIG. 5 is a control block diagram illustrating a process executed by the control unit 91 to control the electric motor 80. The control unit 91 executes a program stored in the storage unit 90 to function as a command torque computation unit 911, a command current computation unit 912, a deviation computation unit 913, a proportional-integral (PI) control unit 914, a motor current PWM control unit 915, a control current computation unit 916, a control current PWM control unit 917, a determination unit 918, and an abnormality detection unit 919. In addition, the control unit 91 can acquire various kinds of vehicle state information through an in-vehicle communication network such as a controller area network (CAN), for example. The vehicle state information includes not only the respective rotational speeds of the front wheels 104R, 104L and the rear wheels 105R, 105L and the amount of depressing operation of the accelerator pedal, but also the position of a shift lever, the amount of depression of a brake pedal, vehicle speed information, and so forth.

The command torque computation unit 911 computes command torque $T^*$, which is a target value for a drive force that should be transferred by the clutch mechanism 5, on the basis of the vehicle state information. The command current computation unit 912 computes a command current value $I^*$, which is a target value for a motor current that should be supplied to the electric motor 80, in accordance with the command torque $T^*$. The command torque computation unit 911 computes the command torque $T^*$ with reference to a map stored in the storage unit 90 in accordance with the difference between the respective rotational speeds of the front and rear wheels and the amount of depressing operation of the accelerator pedal, for example. The command current computation unit 912 computes the command current value $I^*$ on the basis of property information that indicates the relationship between the motor current and the drive force which is transferred by the clutch mechanism 5.

The deviation computation unit 913 computes the difference between the command current value $I^*$ and an actual current value $I$, which is a detection value of the motor current detected by a current sensor 920, as a current deviation $\Delta I$. The PI control unit 914 performs current feedback control by computing the duty ratio of a PWM signal to be output to the motor current output unit 92 such that the actual current value $I$ approximates the command current value $I^*$ by performing PI computation on the current deviation $\Delta I$ which is computed by the deviation computation unit 913. The motor current PWM control unit 915 generates a PWM signal that turns on and off the switching elements of the motor current output unit 92 on the basis of the duty ratio which is computed by the PI control unit 914 and the detection value from the rotation sensor 802, and outputs the PWM signal to the motor current output unit 92. Consequently, a motor current that matches the command current value $I^*$ is supplied from the motor current output unit 92 to the electric motor 80.

The control current computation unit 916 computes the duty ratio of a PWM signal output to the control current output unit 93 such that a control current corresponding to the command torque $T^*$ is supplied to the electromagnetic valve 82. The control current PWM control unit 917 generates a PWM signal that turns on and off the switching elements of the motor current output unit 92 on the basis of the computed duty ratio, and outputs the PWM signal to the control current output unit 93. In the present embodiment, the valve opening of the electromagnetic valve 82 becomes larger as the control current which is supplied to the electromagnetic valve 82 is larger. Conversely, however, an electromagnetic valve with a valve opening that becomes smaller as the control current is larger may also be used.

The determination unit 918 determines, on the basis of the vehicle state information, whether or not vibration or the like that may be sensed by the driver or a passenger is generated even if the drive force which can be transferred by the friction clutch 53 of the clutch mechanism 5 is fluctuated, that is, whether or not it is a predetermined test operation possible period in which the drive force which is transferred by the friction clutch 53 does not affect travel of the four-wheel-drive vehicle 100. The test operation refers to a series of operations to detect the presence or absence of an abnormality of the flow passage forming member in accordance with at least any of the motor current and the number of revolutions of the motor shaft 801 at the time when the motor shaft 801 is rotated by applying a voltage to the electric motor 80 from a state in which the electric motor 80 is stationary. The test operation possible period refers to a timing when such test operation can be performed.

In the present embodiment, it is determined to be the test operation possible period in the case where the vehicle is stationary, in the case where the vehicle is traveling with the difference between the respective rotational speeds of the front wheels 104R, 104L and the rear wheels 105R, 105L smaller than a predetermined value, in the case where the four-wheel-drive vehicle 100 is traveling steadily forward at a constant vehicle speed, and in the case where the vehicle is traveling in the two-wheel-drive state in which rotation of the propeller shaft 108 is stopped with both transfer of a drive force through the mesh clutch 12 and transfer of a drive force through the drive force transfer device 1 blocked. It is desirable that the test operation should be performed in the two-wheel-drive state in the case where the vehicle is traveling with the difference between the respective rotational speeds of the front wheels 104R, 104L and the rear wheels 105R, 105L smaller than a predetermined value and in the case where the four-wheel-drive vehicle 100 is traveling steadily forward at a constant vehicle speed.

Whether or not the vehicle is stationary can be determined in accordance with the position of the shift lever, the amount of depression of the brake pedal, or the vehicle speed which is included in the vehicle state information, for example. In the case where whether or not the vehicle is stationary is determined in accordance with the position of the shift lever, it can be determined that the vehicle is stationary in the case where the shift lever is at a neutral position or a parking position, for example.

When the vehicle is stationary, travel of the four-wheel-drive vehicle 100 is not affected even if the inner clutch plates 531 and the outer clutch plates 532 are fastened to each other by temporarily pressing the friction clutch 53. Travel of the four-wheel-drive vehicle 100 is not significantly affected, even if the drive force which is transferred by the friction clutch 53 is varied, in the case where the vehicle is traveling with the difference between the respective rotational speeds of the front wheels 104R, 104L and the rear wheels 105R, 105L smaller than a predetermined value and in the case where the four-wheel-drive vehicle 100 is traveling steadily forward at a constant vehicle speed. Furthermore, when the test operation is performed during travel in the two-wheel-drive state in which rotation of the propeller shaft 108 is stopped with both transfer of a drive force through the mesh clutch 12 and transfer of a drive force through the drive force transfer device 1 blocked, travel of the four-wheel-drive vehicle 100 is not affected since transfer of a drive force through the mesh clutch 12 is blocked, although the rotational force of the rear wheels 105R, 105L which accompanies the travel is transferred to the propeller shaft 108 via the friction clutch 53 to slightly rotate the propeller shaft 108.

The abnormality detection unit 919 detects the presence or absence of an abnormality of the flow passage forming member in accordance with variations in motor current or variations in number of revolutions of the motor shaft 801 at the time when a voltage is applied to the electric motor 80 during the test operation. That is, the abnormality detection unit 919 determines that an abnormality is caused in the flow passage forming member in the case where transient variations in motor current or number of revolutions of the motor shaft 801 at the time when a predetermined voltage is applied to the electric motor 80 deviate from an assumed normal range.

The command current computation unit 912 executes a process as the test operation, besides the process as normal operation described above, when it is determined by the determination unit 918 that it is the test operation possible period. During the test operation, the command current computation unit 912 commands the control current computation unit 916 to vary the valve opening of the electromagnetic valve 82. The command torque T* is zero when the determination unit 918 determines that it is the test operation possible period.

In the present embodiment, the command current computation unit 912 and the abnormality detection unit 919 execute, repeatedly for a predetermined number of times in the test operation possible period, first test operation in which the presence or absence of an abnormality of the flow passage forming member is detected by applying a voltage to the electric motor 80 with the amount of a current supplied to the electromagnetic valve 82 set to the amount of a current that brings the electromagnetic valve 82 into a valve open state, and second test operation in which the presence or absence of an abnormality of the flow passage forming member is detected by applying a voltage to the electric motor 80 with the amount of a current supplied to the electromagnetic valve 82 set to the amount of a current that brings the electromagnetic valve 82 into a valve closed state.

Figure 6A:
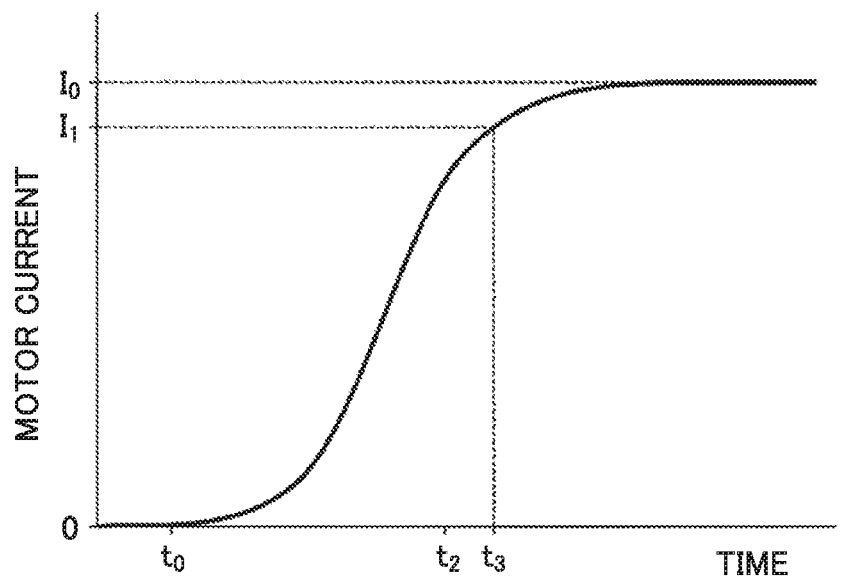
FIG. 6A is a graph illustrating an example of temporal variations in motor current that occur when a voltage is applied to the electric motor with an electromagnetic valve in a fully open state.
Figure 6B:
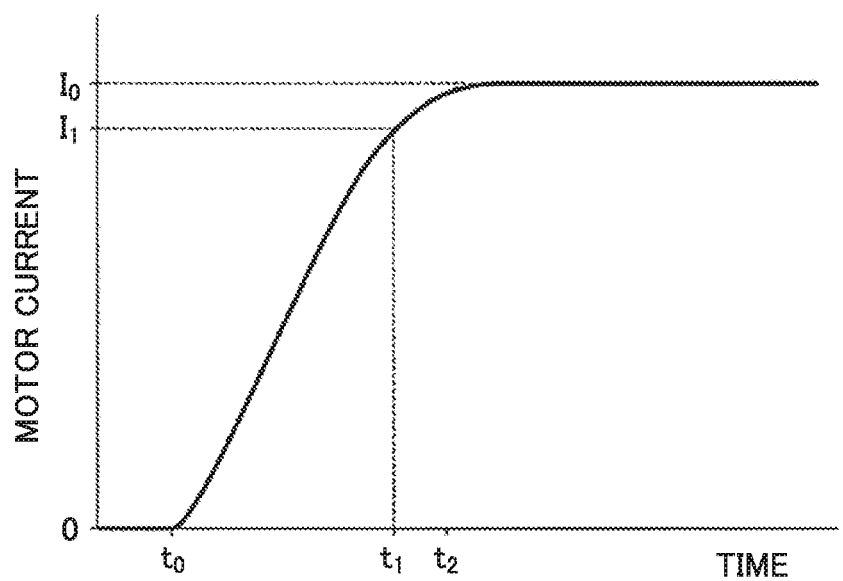
FIG. 6B is a graph illustrating an example of temporal variations in motor current that occur when a voltage is applied to the electric motor with the electromagnetic valve in a fully closed state.

FIG. 6A is a graph illustrating an example of temporal variations in motor current that occur when a voltage is applied to the electric motor 80 with the electromagnetic valve 82 in a fully open state in the test operation possible period. FIG. 6B is a graph illustrating an example of temporal variations in motor current that occur when a voltage is applied to the electric motor 80 with the electromagnetic valve 82 in a fully closed state in the test operation possible period. In FIGS. 6A and 6B, the horizontal axis is the time axis, and the vertical axis indicates the motor current (actual current). In addition, $I_0$ on the vertical axis indicates the command current value, and $I_1$ indicates a current value that is 90% of the command current value.

When a voltage is applied to the electric motor 80 with the electromagnetic valve 82 in the fully open state, the motor current rises gently compared to the time when a voltage is applied to the electric motor 80 with the electromagnetic valve 82 in the fully closed state. The motor current rises gently in the case where the electromagnetic valve 82 is in the fully open state, because the pressure on the discharge side of the pump 81 is not raised easily since working oil discharged from the pump 81 is supplied to the cylinder chamber 220, and it takes time before the load on the electric motor 80 for rotationally driving the pump 81 becomes larger. The motor current rises abruptly in the case where the electromagnetic valve 82 is in the fully closed state, because the pressure on the discharge side of the pump 81 is raised rapidly since working oil is not supplied to the cylinder chamber 220, and the load on the electric motor 80 for rotationally driving the pump 81 immediately becomes larger.

In the example illustrated in FIGS. 6A and 6B, $t_0$ on the horizontal axis indicates the time when application of a voltage to the electric motor 80 is started, $t_1$ indicates the time when the motor current reaches $I_1$ in the case where the electromagnetic valve 82 is in the fully closed state, and $t_3$ indicates the time when the motor current reaches $I_1$ in the case where the electromagnetic valve 82 is in the fully open state. $t_2$ is the middle time between $t_1$ and $t_3$. In this way, it is possible to detect whether the electromagnetic valve 82 is in the valve closed state or the valve open state in accordance with whether the time when the motor current reaches $I_1$ is before or after $t_2$.

Figure 7:
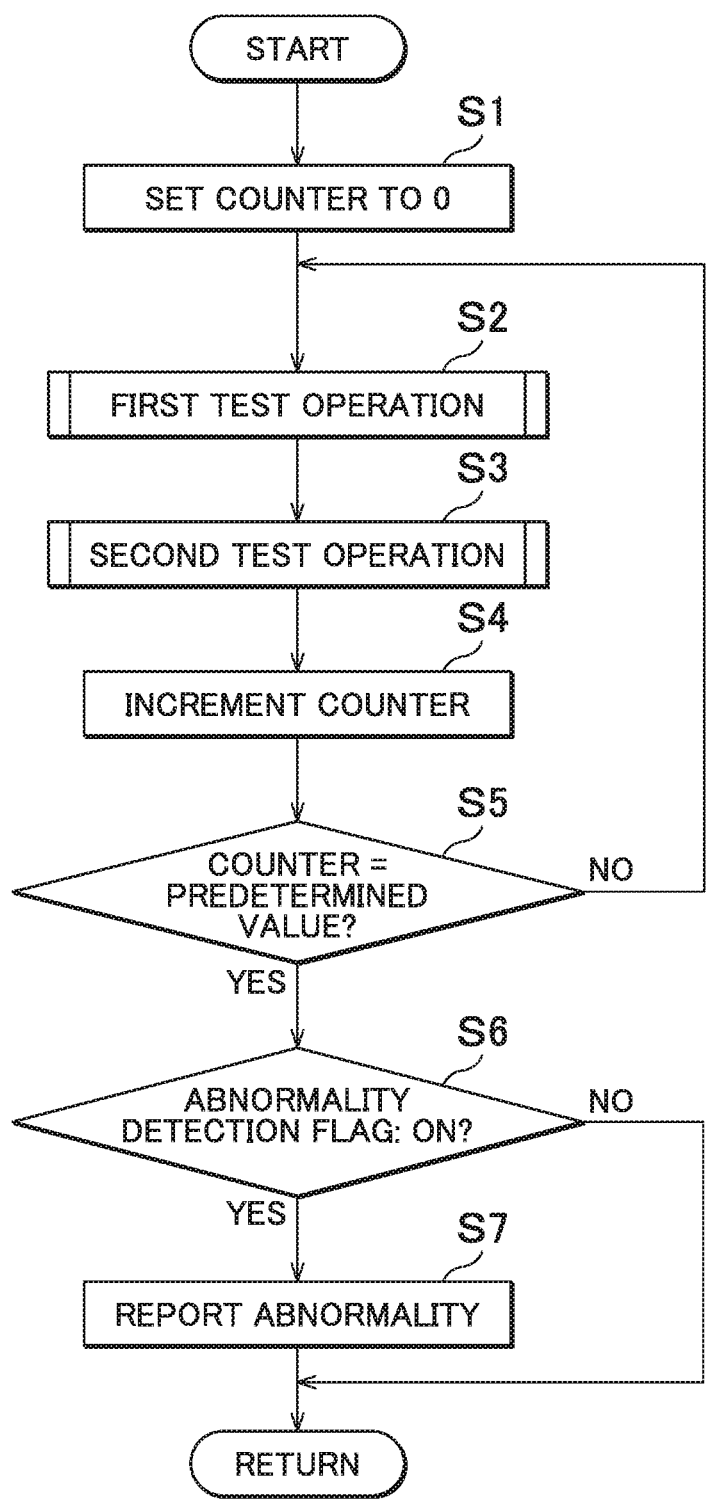
FIG. 7 is a flowchart illustrating an example of a process executed by the control unit.
Figure 8:
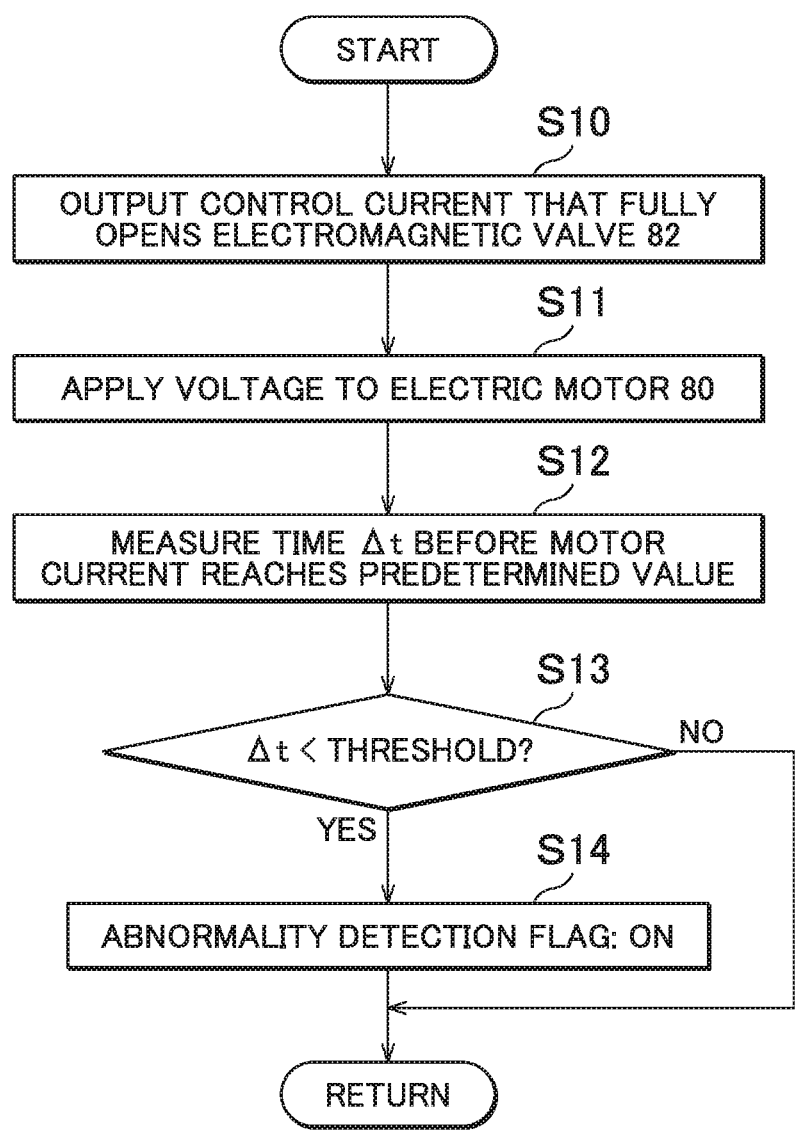
FIG. 8 is a flowchart illustrating an example of a process of first test operation.
Figure 9:
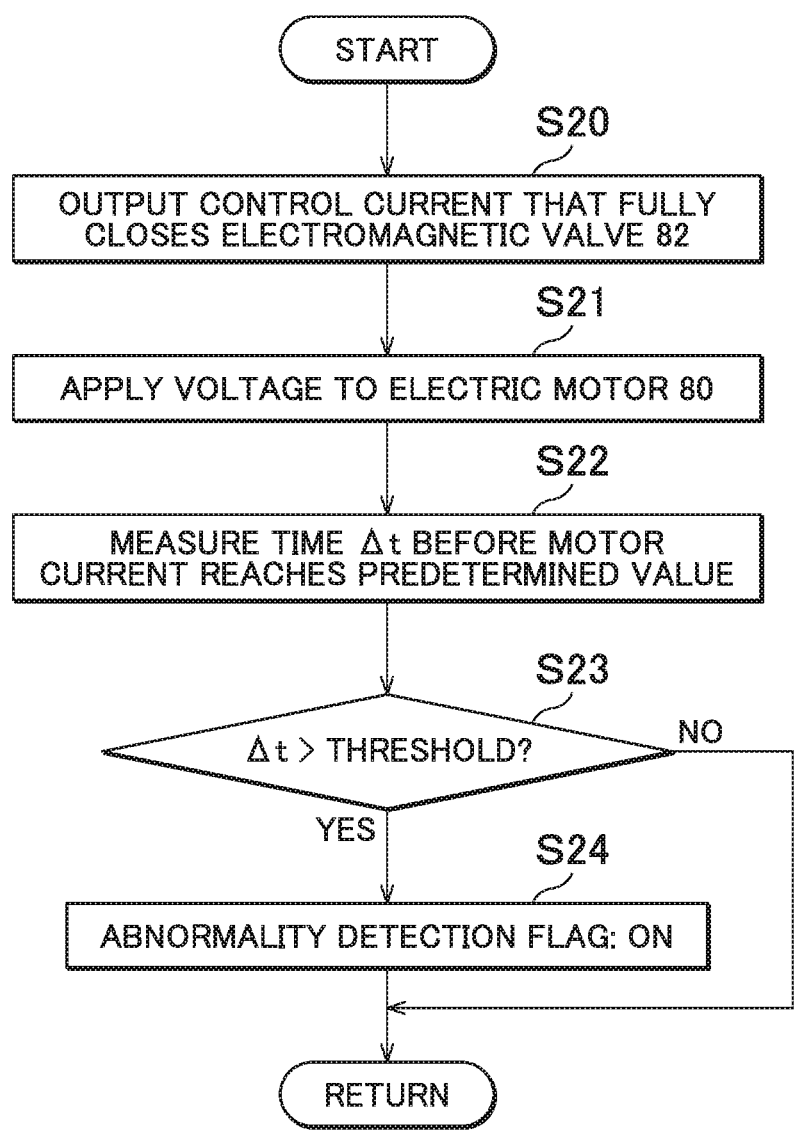
FIG. 9 is a flowchart illustrating an example of a process of second test operation.

FIGS. 7 to 9 are flowcharts illustrating an example of a process executed by the control unit 91 in the test operation possible period. As illustrated in FIG. 7, the control unit 91 first sets the value of a counter to zero (step S1). The counter is a repeat counter that executes the first test operation and the second test operation repeatedly for a predetermined number of times.

Next, the control unit 91 executes the first test operation (step S2). FIG. 8 is a flowchart illustrating the procedure for the first test operation in detail. In the process of the first test operation, the control unit 91 outputs a control current that makes the electromagnetic valve 82 fully open to the electromagnetic valve 82 (step S10). Consequently, the electromagnetic valve 82 is brought into the fully open state if the electromagnetic valve 82 operates normally. Next, the control unit 91 sets the command current value I* to a predetermined value, and applies a voltage to the electric motor 80 (step S11). It is desirable that the command current value I* in this event should be a value that does not cause the electric motor 80 or the pump 81 to make large noise, and that causes the pump 81 to discharge an appropriate amount of working oil in order to perform the test operation.

Next, the control unit 91 measures $\Delta t$ ($=t_3-t_0$) which is a time required for the motor current to reach a predetermined value (e.g. the current value of $I_1$ in FIG. 6A) (step S12), and determines whether or not $\Delta t$ is shorter than a predetermined threshold (step S13). The threshold may be a time from $t_0$ to $t_2$ in FIG. 6A. In the case where $\Delta t$ is shorter than the threshold (S13: Yes) in the determination in step S13, the control unit 91 turns on an abnormality detection flag (step S14), and returns the process to the flowchart illustrated in FIG. 7. In the case where $\Delta t$ is not shorter than the threshold (S13: No) in the determination in step S13, the control unit 91 returns the process to the flowchart illustrated in FIG. 7 without turning on the abnormality detection flag. The abnormality detection flag has been turned off before the first test operation is performed.

Next, the control unit 91 executes the second test operation (step S3). FIG. 9 is a flowchart illustrating the procedure for the second test operation in detail. In the process of the second test operation, the control unit 91 outputs a control current that makes the electromagnetic valve 82 fully closed to the electromagnetic valve 82 (step S20). Consequently, the electromagnetic valve 82 is brought into the fully closed state if the electromagnetic valve 82 operates normally. Next, the control unit 91 sets the command current value I* to a predetermined value, and applies a voltage to the electric motor 80 (step S21). The command current value I* in this event is the same value as the command current value I* in step S11.

Next, the control unit 91 measures $\Delta t$ ($=t_1-t_0$) which is a time required for the motor current to reach a predetermined value (e.g. the current value of $I_1$ in FIG. 6B) (step S22), and determines whether or not $\Delta t$ is longer than a predetermined threshold (step S23). The threshold may be the same value as that used in step S13 (a time from $t_0$ to $t_2$ in FIG. 6B). In the case where $\Delta t$ is longer than the threshold (S23: Yes) in the determination in step S23, the control unit 91 turns on the abnormality detection flag (step S24), and returns the process to the flowchart illustrated in FIG. 7. In the case where $\Delta t$ is not longer than the threshold (S23: No) in the determination in step S23, the control unit 91 returns the process to the flowchart illustrated in FIG. 7 without turning on the abnormality detection flag.

After the second test operation is executed, the control unit 91 increments the counter (step S4), and determines whether or not the counter indicates the predetermined value (step S5). If the counter does not indicate the predetermined value (S5: No) as a result of the determination, the processes in steps S2 to S4 are repeatedly executed again. If the counter indicates a predetermined value (S5: Yes), on the other hand, the control unit 91 executes the process in step S6. An abnormality in operation of the electromagnetic valve 82 can be detected more reliably as the number of repetitions is larger. However, a long test time is required if the number of repetitions is large, and thus it is desirable that the number of repetitions should be set to about two to five times, for example.

In step S6, the control unit 91 determines whether or not the abnormality detection flag is in the on state. If it is determined that the abnormality detection flag is in the on state (S6: Yes), the control unit 91 executes an abnormality reporting process (step S7). In the abnormality reporting process, a warning lamp 10 (see FIG. 5) provided in the cabin so as to be easily visually recognizable by the driver is lit up, for example. If the abnormality detection flag is not in the on state (S6: No), on the other hand, the control unit 91 ends the process of the flowchart illustrated in FIG. 7 without executing the abnormality reporting process.

The process procedure for a case where an abnormality of the electromagnetic valve 82 is detected in accordance with variations in motor current has been described above with reference to FIGS. 7 to 9. With the process procedure, an abnormality of the flow passage forming member other than the electromagnetic valve 82 (such as the pump 81 and the orifice 84, for example) can also be detected similarly. In the case where an abnormality of the flow passage forming member is detected, occurrence of the abnormality can be reported to the driver. Thus, it is possible to prompt the driver for repair such as part replacement.

The process for detecting an abnormality of the flow passage forming member which is executed by the control unit 91 is not limited to detecting an abnormality in accordance with variations in motor current, and it is also possible to detect an abnormality of the flow passage forming member in accordance with the amount of rotation (accumulated amount of rotation) of the motor shaft 801 made since a voltage is applied to the electric motor 80. Next, two specific examples (first and second different examples) for a case where an abnormality of the flow passage forming member is detected in accordance with the amount of rotation of the motor shaft 801 will be described with reference to FIGS. 10 to 15.

Figure 10A:
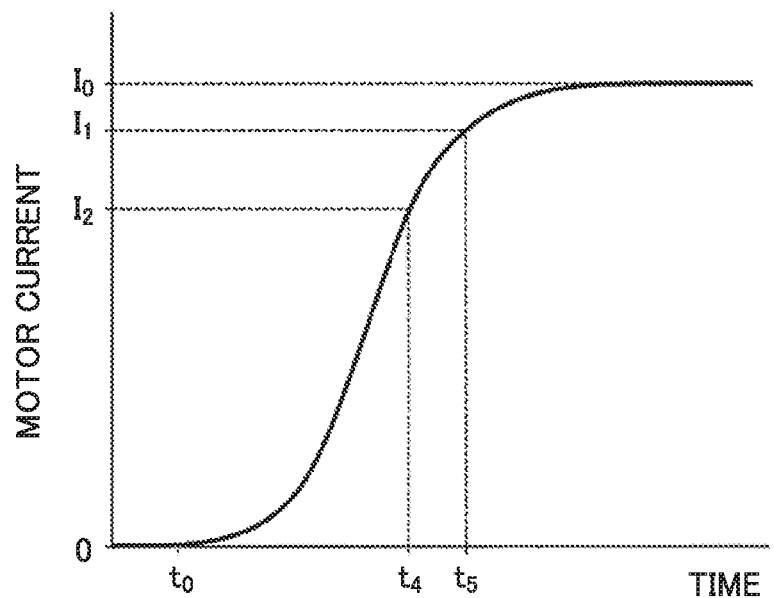
FIG. 10A illustrates an example of the state of operation of the electric motor at the time when a voltage is applied to the electric motor with the electromagnetic valve in a fully open state, illustrating variations in motor current.
Figure 10B:
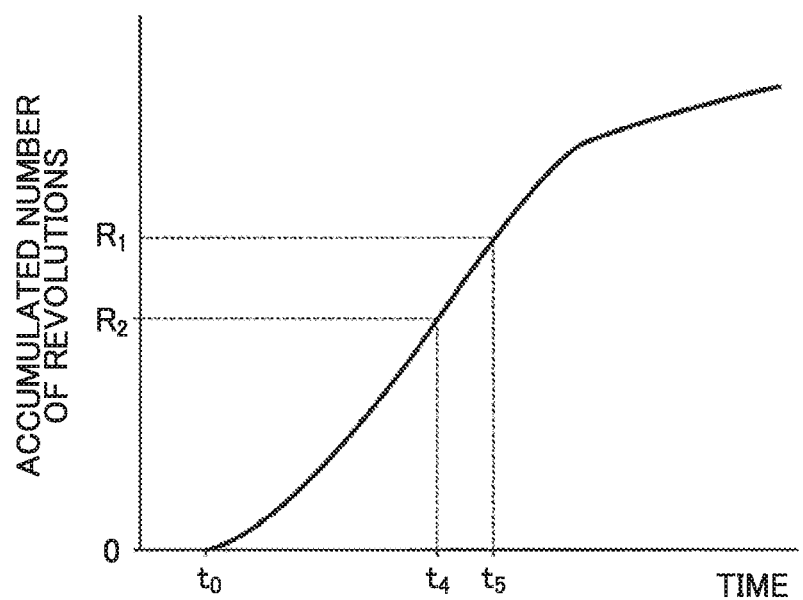
FIG. 10B illustrates an example of the state of operation of the electric motor at the time when a voltage is applied to the electric motor with the electromagnetic valve in a fully open state, illustrating variations in accumulated number of revolutions of a motor shaft.
Figure 11A:
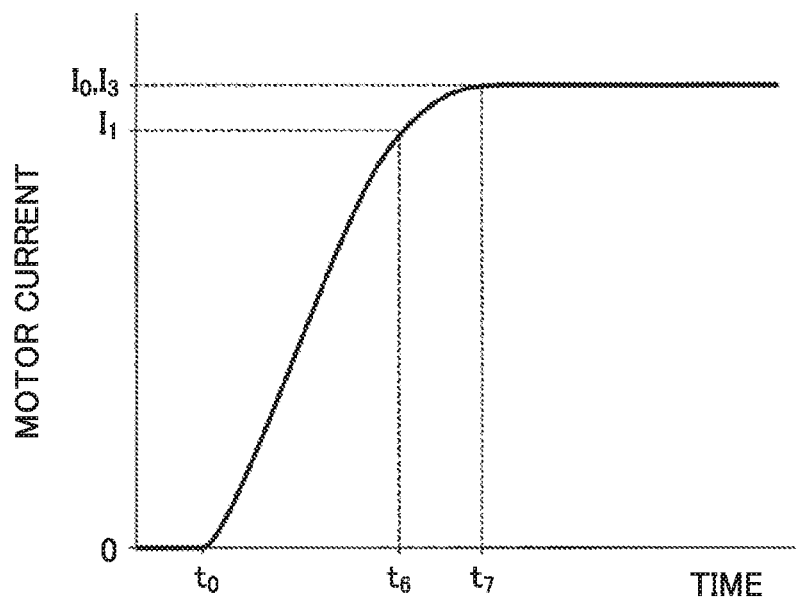
FIG. 11A illustrates an example of the state of operation of the electric motor at the time when a voltage is applied to the electric motor with the electromagnetic valve in a fully closed state, illustrating variations in motor current.
Figure 11B:
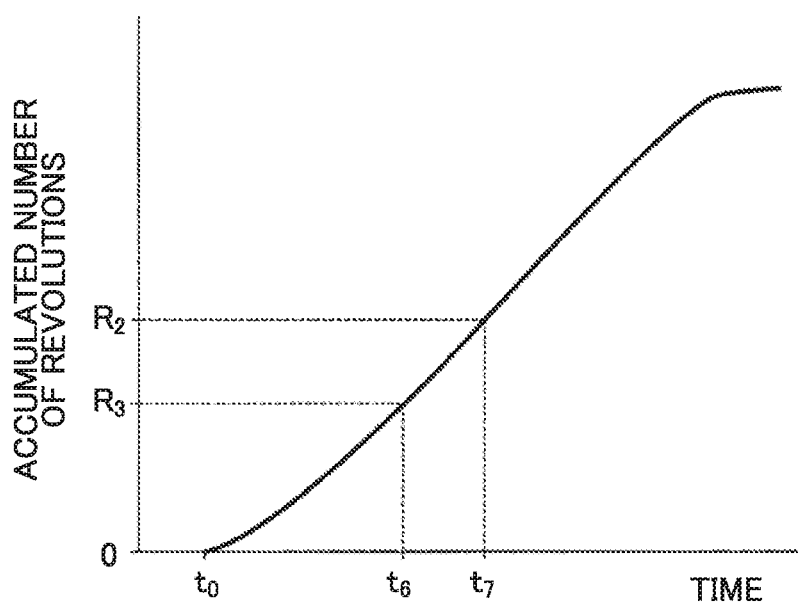
FIG. 11B illustrates an example of the state of operation of the electric motor at the time when a voltage is applied to the electric motor with the electromagnetic valve in a fully closed state, illustrating variations in accumulated number of revolutions of the motor shaft.

FIGS. 10A and 10B illustrate an example of the state of operation of the electric motor 80 at the time when a voltage is applied to the electric motor 80 with the electromagnetic valve 82 in a fully open state. FIG. 10A illustrates variations in motor current. FIG. 10B illustrates variations in accumulated number of revolutions of the motor shaft 801. FIGS. 11A and 11B illustrate an example of the state of operation of the electric motor 80 at the time when a voltage is applied to the electric motor 80 with the electromagnetic valve 82 in a fully closed state. FIG. 11A illustrates variations in motor current. FIG. 11B illustrates variations in accumulated number of revolutions of the motor shaft 801. In FIGS. 10A and 10B and 11A and 11B, the horizontal axis is the time axis, and $t_0$ indicates the time when application of a voltage to the electric motor 80 is started. In FIGS. 10A and 11A, $I_0$ on the vertical axis indicates the command current value, and $I_1$ indicates a current value that is 90% of the command current value.

As discussed earlier, the motor current rises gently when a voltage is applied to the electric motor 80 with the electromagnetic valve 82 in the fully open state, and the motor current rises abruptly when a voltage is applied to the electric motor 80 with the electromagnetic valve 82 in the fully closed state. When a voltage is applied to the electric motor 80 with the electromagnetic valve 82 in the fully open state, the load on the pump 81 is small, and thus the proportion of increase in accumulated number of revolutions of the motor shaft 801 is high compared to the time when a voltage is applied to the electric motor 80 with the electromagnetic valve 82 in the fully closed state. The accumulated number of revolutions of the motor shaft 801 is equivalent to the total amount of working oil discharged by the pump 81 since a voltage is applied to the electric motor 80 in the test operation. The control unit 91 can detect the accumulated number of revolutions of the motor shaft 801 using the rotation sensor 802.

When a voltage is applied to the electric motor 80 with the electromagnetic valve 82 in the fully open state, the accumulated number of revolutions of the motor shaft 801 at time $t_5$ at which the motor current reaches $I_1$ is $R_1$ indicated in FIG. 10B. When a voltage is applied to the electric motor 80 with the electromagnetic valve 82 in the fully closed state, on the other hand, the accumulated number of revolutions of the motor shaft 801 at time $t_6$ at which the motor current reaches $I_1$ is $R_3$ indicated in FIG. 11B. Since $R_1$ is larger than $R_3$, it is possible to detect the presence or absence of an abnormality of the flow passage forming member, which forms a flow passage for working oil, in accordance with the accumulated number of revolutions of the motor shaft 801 made since a voltage is applied to the electric motor 80 until the motor current reaches a predetermined value ($I_1$ in the present example).

Figure 12:
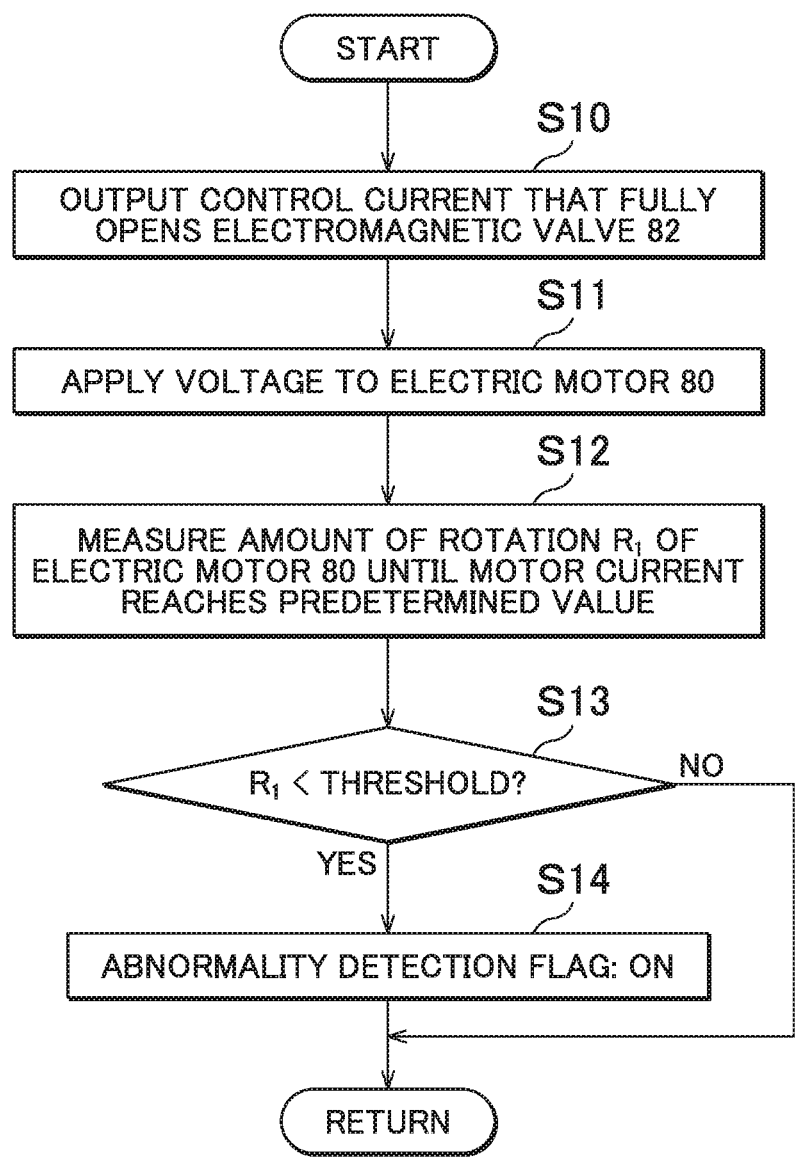
FIG. 12 is a flowchart illustrating a process of first test operation according to a first different example.

FIG. 12 is a flowchart for a case where the presence or absence of an abnormality of the flow passage forming member is detected in accordance with the accumulated number of revolutions of the motor shaft 801 made since a voltage is applied to the electric motor 80 until the motor current reaches a predetermined value in the first test operation in which a voltage is applied to the electric motor 80 with the electromagnetic valve 82 in the valve open state. In the flowchart, the processes in steps S10 and S11 are the same as the processes described with reference to FIG. 8. In step S12, the control unit 91 measures the number of revolutions ($R_1$) of the electric motor 80 made since a voltage is applied to the electric motor 80 until the motor current reaches a predetermined value (W. Next, the control unit 91 determines whether or not the measured number of revolutions ($R_1$) is smaller than a threshold (step S13). The threshold may be $R_2$ which is the middle value between $R_1$ and $R_3$, for example. In the case where $R_1$ is smaller than the threshold (S13: Yes) in the determination in step S13, the control unit 91 turns on the abnormality detection flag (step S14).

Figure 13:
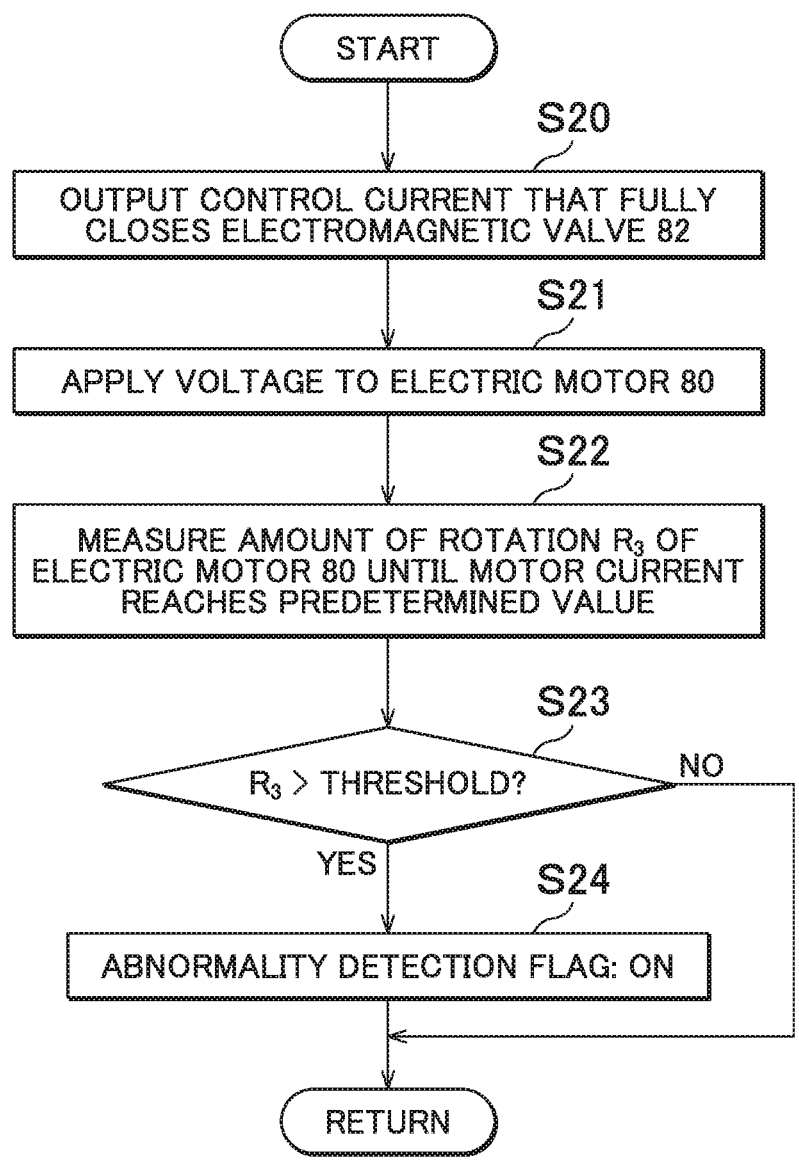
FIG. 13 is a flowchart illustrating a process of second test operation according to the first different example.

FIG. 13 is a flowchart for a case where the presence or absence of an abnormality of the flow passage forming member is detected in accordance with the accumulated number of revolutions of the motor shaft 801 made since a voltage is applied to the electric motor 80 until the motor current reaches a predetermined value in the second test operation in which a voltage is applied to the electric motor 80 with the electromagnetic valve 82 in the valve closed state. In the flowchart, the processes in steps S20 and S21 are the same as the processes described with reference to FIG. 9. In step S22, the control unit 91 measures the number of revolutions ($R_3$) of the electric motor 80 made since a voltage is applied to the electric motor 80 until the motor current reaches a predetermined value ($I_1$). Next, the control unit 91 determines whether or not the measured number of revolutions ($R_3$) is larger than a threshold (step S23). The threshold may be $R_2$ which is the middle value between $R_1$ and $R_3$, for example, in the same manner as described above. In the case where $R_1$ is larger than the threshold (S23: Yes) in the determination in step S23, the control unit 91 turns on the abnormality detection flag (step S24).

As illustrated in FIGS. 10A, 10B, 11A, and 11B, when $R_2$ is determined as a predetermined value of the accumulated number of revolutions of the motor shaft 801, the motor current at the time (t4, t7) when the accumulated number of revolutions reaches the predetermined value is $I_2$ indicated in FIG. 10A when a voltage is applied to the electric motor 80 with the electromagnetic valve 82 in the fully open state, and $I_3$ indicated in FIG. 11A when a voltage is applied to the electric motor 80 with the electromagnetic valve 82 in the fully closed state. In FIG. 11A, $I_3$ coincides with the command current value ($I_0$). Since $I_2$ is smaller than $I_3$, it is possible to detect the presence or absence of an abnormality of the flow passage forming member, which forms a flow passage for working oil, in accordance with the motor current at the time when the number of revolutions of the motor shaft 801 made since a voltage is applied to the electric motor 80 reaches the predetermined value.

Figure 14:
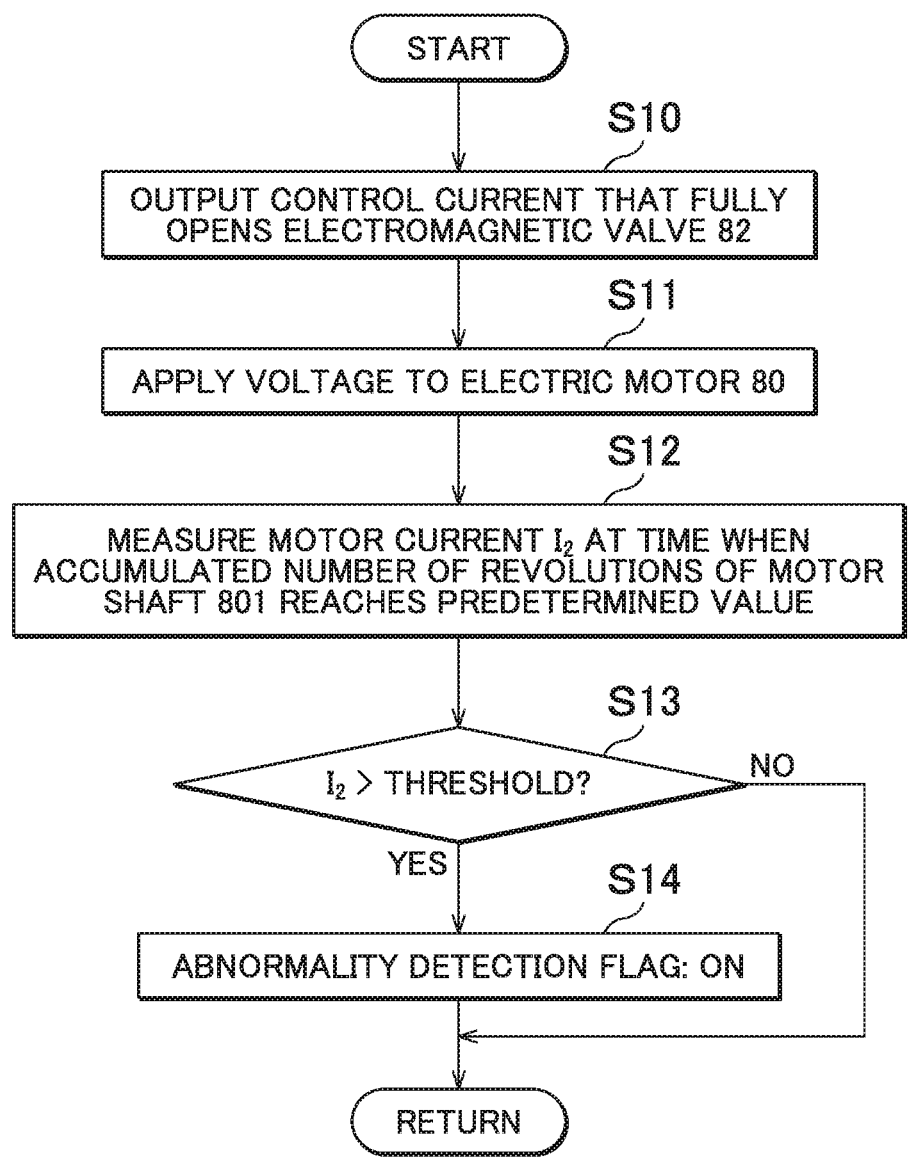
FIG. 14 is a flowchart illustrating a process of first test operation according to a second different example.

FIG. 14 is a flowchart for a case where the presence or absence of an abnormality of the flow passage forming member is detected in accordance with the motor current at the time ($t_4$) when the number of revolutions of the motor shaft 801 made since a voltage is applied to the electric motor 80 reaches the predetermined value in the first test operation in which a voltage is applied to the electric motor 80 with the electromagnetic valve 82 in the valve open state. In the flowchart, the processes in steps S10 and S11 are the same as the processes described with reference to FIG. 8. In step S12, the control unit 91 measures the motor current ($I_2$) at the time when the number of revolutions of the motor shaft 801 made since a voltage is applied to the electric motor 80 reaches the predetermined value. Next, the control unit 91 determines whether or not the measured motor current ($I_2$) is larger than a threshold (step S13). The threshold may be $I_1$, for example. In the case where $I_2$ is larger than the threshold (S13: Yes) in the determination in step S13, the control unit 91 turns on the abnormality detection flag (step S14).

Figure 15:
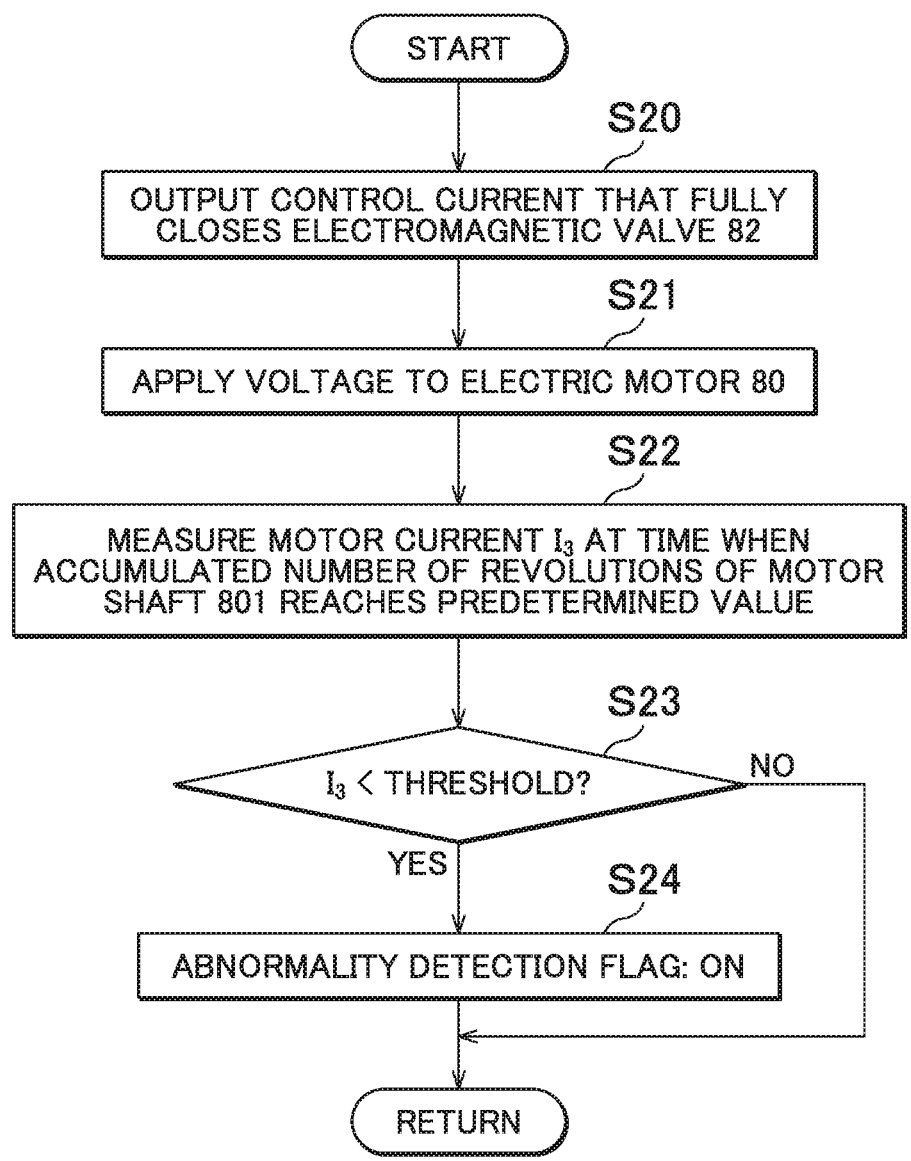
FIG. 15 is a flowchart illustrating a process of second test operation according to the second different example.

FIG. 15 is a flowchart for a case where the presence or absence of an abnormality of the flow passage forming member is detected in accordance with the motor current at the time ($t_7$) when the number of revolutions of the motor shaft 801 made since a voltage is applied to the electric motor 80 reaches the predetermined value in the second test operation in which a voltage is applied to the electric motor 80 with the electromagnetic valve 82 in the valve closed state. In the flowchart, the processes in steps S20 and S21 are the same as the processes described with reference to FIG. 9. In step S22, the control unit 91 measures the motor current ($I_3$) at the time when the number of revolutions of the motor shaft 801 made since a voltage is applied to the electric motor 80 reaches the predetermined value. Next, the control unit 91 determines whether or not the measured motor current ($I_3$) is smaller than a threshold (step S23). The threshold may be $I_1$, for example. In the case where $I_3$ is smaller than the threshold (S23: Yes) in the determination in step S23, the control unit 91 turns on the abnormality detection flag (step S24).

With such first and second different examples, as with the process described with reference to FIGS. 6 to 9, an abnormality of the flow passage forming member can be detected, and it is possible to report occurrence of an abnormality of the flow passage forming member to the driver in the case where such an abnormality is detected.

Figure 16:
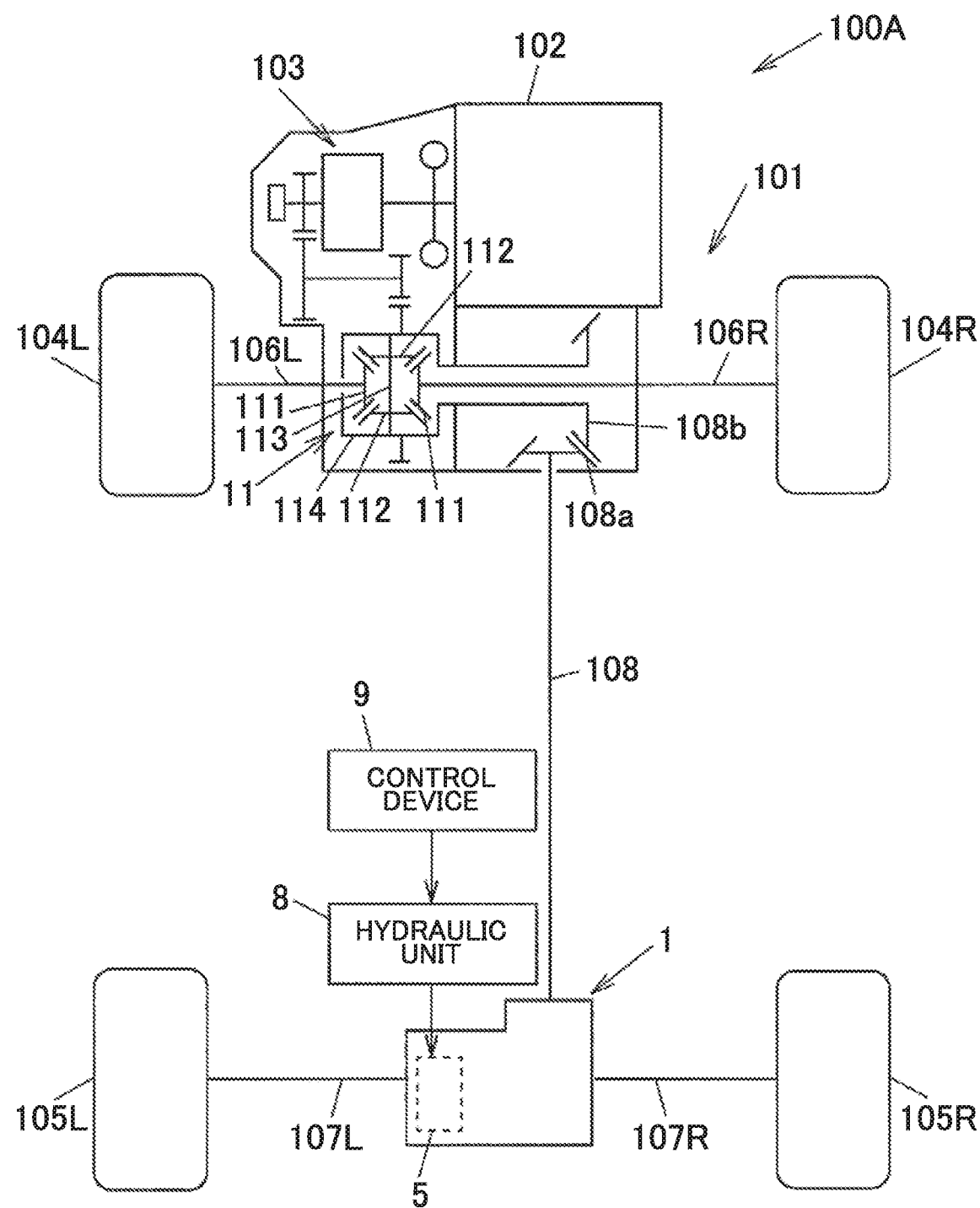
FIG. 16 is a diagram schematically illustrating an example of the configuration of a four-wheel-drive vehicle according to a modification.

In addition, the configuration of the four-wheel-drive vehicle is not limited to that illustrated in FIG. 1, and can be modified as appropriate. FIG. 16 is a diagram schematically illustrating an example of the configuration of a four-wheel-drive vehicle 100A according to a modification. The four-wheel-drive vehicle 100A does not have the mesh clutch 12, and is different in configuration from the four-wheel-drive vehicle 100 illustrated in FIG. 1 in that the ring gear 108*b* is directly coupled to the front differential case 114. In the four-wheel-drive vehicle 100A, the drive force of the engine 102 is always transferred to the propeller shaft 108.

The test operation possible period in which test operation can be executed with the electromagnetic valve 82 in the valve open state in the four-wheel-drive vehicle 100A includes the time when the vehicle is stationary, the time when the vehicle is traveling with the difference between the respective rotational speeds of the front wheels 104R, 104L and the rear wheels 105R, 105L smaller than a predetermined value, and the time when the four-wheel-drive vehicle 100 is traveling steadily forward at a constant vehicle speed. It is desirable that the test operation should be performed in the two-wheel-drive state in the case where the vehicle is traveling with the difference between the respective rotational speeds of the front wheels 104R, 104L and the rear wheels 105R, 105L smaller than a predetermined value and in the case where the four-wheel-drive vehicle 100 is traveling steadily forward at a constant vehicle speed.

It is desirable that the test operation should be performed during travel in the two-wheel-drive state in which the difference between the respective rotational speeds of the front wheels 104R, 104L and the rear wheels 105R, 105L is smaller than a predetermined value and in which the average rotational speed of the front wheels 104R, 104L and the average rotational speed of the rear wheels 105R, 105L are substantially equal to each other. Furthermore, it is desirable that the test operation which is performed with the electromagnetic valve 82 in the valve open state should be performed when the vehicle is traveling steadily forward at a constant vehicle speed in the two-wheel-drive state. The control device 9 can detect that the vehicle is traveling steadily in accordance with the respective wheel speeds of the front wheels 104R, 104L and the rear wheels 105R, 105L and the amount of depressing operation of the accelerator pedal, for example. On the other hand, it is desirable that the test operation possible period in which the test operation can be executed with the electromagnetic valve 82 in the valve closed state in the four-wheel-drive vehicle 100A should be when the vehicle is stationary and when the vehicle is traveling in the two-wheel-drive state.

During travel in the two-wheel-drive state in which the average rotational speed of the front wheels 104R, 104L and the average rotational speed of the rear wheels 105R, 105L are equal to each other, the first rotary member 51 and the second rotary member 52 are rotating at the same speed as each other. Therefore, travel of the four-wheel-drive vehicle 100 is not affected even if the inner clutch plates 531 and the outer clutch plates 532 are fastened to each other when the friction clutch 53 is temporarily pressed by performing the test operation with the electromagnetic valve 82 in the valve open state. In the test operation which is performed with the electromagnetic valve 82 in the valve closed state, meanwhile, the clutch mechanism 5 is not actuated with no working oil supplied to the cylinder chamber 220 unless there is an abnormality with the electromagnetic valve 82. Thus, travel of the four-wheel-drive vehicle 100 is not affected even during travel in the two-wheel-drive state in which the difference between the respective rotational speeds of the front wheels 104R, 104L and the rear wheels 105R, 105L is large.

With the present embodiment described above, the presence or absence of an abnormality of the flow passage forming member such as the electromagnetic valve 82 can be detected in accordance with at least any of the motor current and the number of revolutions of the motor shaft 801 at the time when the motor shaft 801 is rotated by applying a voltage to the electric motor 80. Consequently, it is possible to detect the presence or absence of an abnormality of the flow passage forming member even without installing a pressure detection unit, such as a pressure sensor, that detects a pressure in a flow passage for working oil, which enables a reduction in device cost.

With the present invention, the test operation is performed in a predetermined test operation possible period in which travel is not affected by a drive force transferred by the friction clutch 53. Thus, it is possible to suppress a sense of discomfort given to the driver or a passenger with abnormal sound or vibration generated during the test operation.

The present invention can be modified, as appropriate, without departing from the scope and spirit of the present invention. For example, in the embodiment described above, the first test operation and the second test operation are repeated continuously for a plurality of times. However, the present invention is not limited thereto. For example, the first test operation and the second test operation may be performed only once each when it is determined to be the test operation possible period. Furthermore, only one of the first test operation and the second test operation may be performed in accordance with the vehicle travel state.

The first test operation and the second test operation may be executed when the engine 102 is started, that is, each time an ignition switch is turned on. In this case, the number of times that an abnormality of the flow passage forming member is detected may be stored in a non-volatile memory of the storage unit 90, and an abnormality may be determined and reported to the driver in the case where the number exceeds a predetermined value (in the case where an abnormality is detected at a plurality of times of startup).

In addition, the four-wheel-drive vehicle 100 illustrated in FIG. 1 may be configured such that the sleeve 123 of the mesh clutch 12 is moved by a piston of a hydraulic actuator, and the hydraulic unit and the control device according to the present invention may be used in order to supply working oil to a cylinder chamber of the piston.

What is claimed is:

1. A four-wheel-drive vehicle comprising:
    main drive wheels and auxiliary drive wheels, to which a drive force of a drive source is transferred;
    a drive force transfer device that is capable of blocking transfer of the drive force to the auxiliary drive wheels;
    a hydraulic unit that supplies a working fluid to the drive force transfer device; and
    a control device that controls the hydraulic unit, wherein:
    the four-wheel-drive vehicle is switchable between a four-wheel-drive state, in which the drive force is transferred to the main drive wheels and the auxiliary drive wheels, and a two-wheel-drive state, in which the drive force is transferred to only the main drive wheels;
    the hydraulic unit has an electric motor, to which a motor current is supplied from the control device, and a pump that is actuated by rotation of a motor shaft of the electric motor;
    the drive force transfer device has a piston that is moved by a pressure of a working fluid supplied from the pump to a cylinder, and a clutch that is switchable between a transfer state, in which transfer of the drive force to the auxiliary drive wheels is allowed, and a blocked state, in which such transfer is blocked, in accordance with movement of the piston; and
    the control device detects presence or absence of an abnormality of a flow passage forming member, which forms a flow passage for the working fluid, in accordance with at least any of the motor current and a number of revolutions of the motor shaft at the time when the motor shaft is rotated by applying a voltage to the electric motor.

2. The four-wheel-drive vehicle according to claim 1, wherein
    the control device detects the presence or absence of an abnormality of the flow passage forming member in accordance with at least any of the motor current and the number of revolutions of the motor shaft at the time when the motor shaft is rotated by applying a voltage to the electric motor from a state in which rotation of the motor shaft is stopped in a predetermined test operation possible period in which travel is not affected by the drive force which is transferred by the clutch.

3. The four-wheel-drive vehicle according to claim 2, wherein:
    the hydraulic unit has, as the flow passage forming member, an electromagnetic valve disposed between the pump and the cylinder in the flow passage, a valve opening of the electromagnetic valve being varied in accordance with a current supplied from the control device; and
    the control device detects the presence or absence of an abnormality of the flow passage forming member by applying a voltage to the electric motor with an amount of the current which is supplied to the electromagnetic valve set to an amount of a current that brings the electromagnetic valve into a valve open state in the test operation possible period.

4. The four-wheel-drive vehicle according to claim 2, wherein:
    the hydraulic unit has, as the flow passage forming member, an electromagnetic valve disposed between the pump and the cylinder in the flow passage, a valve opening of the electromagnetic valve being varied in accordance with a current supplied from the control device; and
    the control device detects the presence or absence of an abnormality of the flow passage forming member by applying a voltage to the electric motor with an amount of the current which is supplied to the electromagnetic valve set to an amount of a current that brings the electromagnetic valve into a valve closed state in the test operation possible period.

5. The four-wheel-drive vehicle according to claim 4, wherein
    the test operation possible period is a time when the vehicle is in the two-wheel-drive state.

6. The four-wheel-drive vehicle according to claim 2, further comprising:
    a propeller shaft that extends in a vehicle front-rear direction, as a constituent element of a drive force transfer system that transfers the drive force of the drive source to the auxiliary drive wheels;
    a first engagement/disengagement portion provided on an upstream side of the propeller shaft in the drive force transfer system to allow and block transfer of the drive force; and
    a second engagement/disengagement portion provided on a downstream side of the propeller shaft in the drive force transfer system to allow and block transfer of the drive force, wherein:
    at least one of the first engagement/disengagement portion and the second engagement/disengagement portion is constituted by the clutch; and
    the test operation possible period is a time when the vehicle is traveling with rotation of the propeller shaft stopped with both transfer of the drive force through the first engagement/disengagement portion and transfer of the drive force through the second engagement/disengagement portion blocked.

7. The four-wheel-drive vehicle according to claim 2, wherein:
    the hydraulic unit has, as the flow passage forming member, an electromagnetic valve disposed between the pump and the cylinder in the flow passage, a valve opening of the electromagnetic valve being varied in accordance with a current supplied from the control device; and
    the control device executes, in the test operation possible period, first test operation in which the presence or absence of an abnormality of the flow passage forming member is detected by applying a voltage to the electric motor with an amount of the current which is supplied to the electromagnetic valve set to an amount of a current that brings the electromagnetic valve into a valve open state, and second test operation in which the presence or absence of an abnormality of the flow passage forming member is detected by applying a voltage to the electric motor with the amount of the current which is supplied to the electromagnetic valve set to an amount of a current that brings the electromagnetic valve into a valve closed state.

8. The four-wheel-drive vehicle according to claim 2, wherein
    the test operation possible period is a time when the vehicle is stationary.

9. The four-wheel-drive vehicle according to claim 2, wherein
    the test operation possible period is a time when the vehicle is traveling with a difference between respective rotational speeds of the main drive wheels and the auxiliary drive wheels smaller than a predetermined value.

10. The four-wheel-drive vehicle according to claim 2, wherein
the test operation possible period is a time when the vehicle is traveling steadily.

11. The four-wheel-drive vehicle according to claim 1, wherein
the control device detects the presence or absence of an abnormality of the flow passage forming member, which forms the flow passage for the working fluid, in accordance with a time required since a voltage is applied to the electric motor until the motor current reaches a predetermined value.

12. The four-wheel-drive vehicle according to claim 1, wherein
the control device detects the presence or absence of an abnormality of the flow passage forming member, which forms the flow passage for the working fluid, in accordance with the number of revolutions of the motor shaft made since a voltage is applied to the electric motor until the motor current reaches a predetermined value.

13. The four-wheel-drive vehicle according to claim 1, wherein
the control device detects the presence or absence of an abnormality of the flow passage forming member, which forms the flow passage for the working fluid, in accordance with the motor current at a time when the number of revolutions of the motor shaft made since a voltage is applied to the electric motor reaches a predetermined value.

* * * * *